(12) United States Patent
Bell et al.

(10) Patent No.: US 10,866,937 B2
(45) Date of Patent: *Dec. 15, 2020

(54) APPARATUS, SYSTEMS, AND METHODS FOR ANALYZING MOVEMENTS OF TARGET ENTITIES

(71) Applicant: Factual Inc., Los Angeles, CA (US)

(72) Inventors: Tyler Bell, Los Angeles, CA (US); Bill Michels, Los Angeles, CA (US); Spencer Tipping, Los Angeles, CA (US); Tom White, Los Angeles, CA (US); Boris Shimanovsky, Los Angeles, CA (US)

(73) Assignee: Factual Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,869

(22) Filed: Jan. 30, 2020

(65) Prior Publication Data
US 2020/0167322 A1    May 28, 2020

Related U.S. Application Data

(63) Continuation of application No. 16/352,664, filed on Mar. 13, 2019, now Pat. No. 10,579,600, which is a
(Continued)

(51) Int. Cl.
*G06F 16/21* (2019.01)
*G06N 20/00* (2019.01)
(Continued)

(52) U.S. Cl.
CPC ......... *G06F 16/21* (2019.01); *G05B 13/0265* (2013.01); *G06F 16/23* (2019.01);
(Continued)

(58) Field of Classification Search
CPC .. G06F 16/21; G06F 16/2455; G06F 16/2458; G06F 16/23; G06F 16/951;
(Continued)

(56) References Cited

U.S. PATENT DOCUMENTS 5,701,467 A    12/1997  Freeston
6,212,393 B1    4/2001  Suarez et al.
(Continued)

FOREIGN PATENT DOCUMENTS

CN          102955792 A     3/2013
WO    WO 2002/010989 A2    2/2002
(Continued)

OTHER PUBLICATIONS

Supplementary European Search Report/Opinion EP14725817, dated Dec. 1, 2016, 6 pages.
(Continued)

*Primary Examiner* — Meless N Zewdu

(57) ABSTRACT

The present disclosure relates to apparatus, systems, and methods for providing a location information analytics mechanism. The location information analytics mechanism is configured to analyze location information to extract contextual information (e.g., profile) about a mobile device or a user of a mobile device, collectively referred to as a target entity. The location information analytics mechanism can include analyzing location data points associated with a target entity to determine features associated with the target entity, and using the features to predict attributes associated with the target entity. The set of predicted attributes can form a profile of the target entity.

20 Claims, 19 Drawing Sheets

Related U.S. Application Data continuation of application No. 15/960,322, filed on Apr. 23, 2018, now Pat. No. 10,255,301, which is a continuation of application No. 15/420,655, filed on Jan. 31, 2017, now Pat. No. 9,977,792, which is a continuation of application No. 14/214,208, filed on Mar. 14, 2014, now Pat. No. 9,594,791.

(60) Provisional application No. 61/799,986, filed on Mar. 15, 2013, provisional application No. 61/800,036, filed on Mar. 15, 2013, provisional application No. 61/799,131, filed on Mar. 15, 2013, provisional application No. 61/799,846, filed on Mar. 15, 2013, provisional application No. 61/799,817, filed on Mar. 15, 2013.

(51) Int. Cl.

| | |
|---|---|
| *G06F 16/23* | (2019.01) |
| *G06F 16/29* | (2019.01) |
| *G06F 16/35* | (2019.01) |
| *G06F 16/28* | (2019.01) |
| *G06F 16/31* | (2019.01) |
| *G06F 16/951* | (2019.01) |
| *G06F 16/2458* | (2019.01) |
| *G06F 16/2455* | (2019.01) |
| *G06Q 10/10* | (2012.01) |
| *G06Q 50/00* | (2012.01) |
| *G05B 13/02* | (2006.01) |
| *H04W 4/029* | (2018.01) |
| *H04W 76/38* | (2018.01) |
| *H04W 4/50* | (2018.01) |
| *G06Q 30/02* | (2012.01) |
| *H04L 12/24* | (2006.01) |
| *H04W 4/02* | (2018.01) |
| *H04W 4/021* | (2018.01) |
| *H04W 8/08* | (2009.01) |
| *H04W 8/16* | (2009.01) |
| *H04W 8/18* | (2009.01) |
| *H04W 16/24* | (2009.01) |
| *H04W 64/00* | (2009.01) |
| *H04W 88/02* | (2009.01) |
| *G06N 5/02* | (2006.01) |
| *G06F 16/335* | (2019.01) |
| *H04W 16/00* | (2009.01) |
| *H04W 16/30* | (2009.01) |
| *H04W 16/32* | (2009.01) |
| *H04W 88/00* | (2009.01) |

(52) U.S. Cl.
CPC ........ *G06F 16/235* (2019.01); *G06F 16/2379* (2019.01); *G06F 16/2386* (2019.01); *G06F 16/2477* (2019.01); *G06F 16/24564* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01); *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.02); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(58) Field of Classification Search
CPC .......... G06F 16/31; G06F 16/28; G06F 16/35; G06F 16/29; G06F 17/30598; G06F 17/30345; G06F 17/30241; G06F 17/30289; G06F 16/235; G06F 16/2386; G06F 16/2477; G06F 16/285; G06F 16/2379; G06F 16/313; G06F 16/282; G06F 16/24564; G06F 16/337; G06Q 30/02; G06Q 50/00; G06Q 10/10; G06Q 50/01; G06Q 10/101; G06Q 30/0261; G06Q 30/0282; H04W 4/02; H04W 8/18; H04W 16/24; H04W 64/00; H04W 4/021; H04W 8/16; H04W 88/02; H04W 76/38; H04W 8/08; H04W 4/029; H04W 4/50; H04W 4/025; H04W 64/003; H04W 41/14; H04W 16/30; H04W 16/00; H04W 88/00; H04W 16/32; H04L 12/24; H04L 41/14; G06N 5/02; G06N 20/00; G06N 5/022

See application file for complete search history.

(56) References Cited

U.S. PATENT DOCUMENTS

| | | |
|---|---|---|
| 6,317,604 B1 | 11/2001 | Kovach, Jr. et al. |
| 6,360,261 B1 | 3/2002 | Boyd et al. |
| 6,594,791 B2 | 7/2003 | Sipola |
| 7,058,639 B1 | 6/2006 | Chatterjee et al. |
| 7,096,214 B1 | 8/2006 | Bharat et al. |
| 7,137,065 B1 | 11/2006 | Huang et al. |
| 7,271,765 B2 | 9/2007 | Stilp et al. |
| 7,330,850 B1 | 2/2008 | Seibel et al. |
| 7,539,666 B2 | 5/2009 | Ashworth et al. |
| 7,576,754 B1 | 8/2009 | Joseph et al. |
| 7,577,680 B1 | 8/2009 | Williams et al. |
| 7,734,661 B2 | 6/2010 | Jordan et al. |
| RE42,285 E | 4/2011 | Anderson et al. |
| 8,015,185 B2 | 9/2011 | Choi et al. |
| 8,046,001 B2 | 10/2011 | Shalmon et al. |
| 8,126,825 B2 | 2/2012 | Guyon |
| 8,195,709 B2 | 6/2012 | Pulfer |
| 8,260,769 B1 | 9/2012 | Narieda et al. |
| 8,301,639 B1 | 10/2012 | Myllymaki et al. |
| 8,326,845 B2 | 12/2012 | Sethi et al. |
| 8,489,596 B1 | 7/2013 | Milton et al. |
| 8,538,973 B1 | 9/2013 | Gonzalez et al. |
| 8,548,177 B2* | 10/2013 | Arnoult, Jr. et al. ........... 381/92 |
| 8,589,069 B1 | 11/2013 | Lehman |
| 8,670,716 B2 | 3/2014 | Yu et al. |
| 8,751,427 B1 | 6/2014 | Mysen et al. |
| 8,843,315 B1 | 9/2014 | Barbeau et al. |
| 8,855,681 B1 | 10/2014 | Geroge et al. |
| 8,909,255 B1 | 12/2014 | Eriksson et al. |
| 8,918,284 B2 | 12/2014 | Tokashiki |
| 8,977,284 B2 | 3/2015 | Reed |
| 9,063,226 B2 | 6/2015 | Zheng et al. |
| 9,317,541 B2 | 4/2016 | Shimanovsky et al. |
| 9,350,532 B2 | 5/2016 | McCreight et al. |
| 9,544,075 B2 | 1/2017 | Altman et al. |
| 9,594,791 B2* | 3/2017 | Bell et al. ......... G06F 17/30345 |
| 9,600,501 B1 | 3/2017 | Fuller |
| 9,686,646 B1 | 6/2017 | Sorden et al. |
| 9,720,555 B2 | 8/2017 | Sorden et al. |
| 9,736,652 B2 | 8/2017 | Su et al. |
| 9,743,236 B1 | 8/2017 | Pecard et al. |
| 9,753,965 B2 | 9/2017 | Rana et al. |
| 9,801,095 B2 | 10/2017 | Henderson et al. |
| 9,906,906 B1 | 2/2018 | Pecard et al. |
| 9,977,792 B2* | 5/2018 | Bell et al. ......... G06F 17/30241 |

(56) References Cited

U.S. PATENT DOCUMENTS

| | | | |
|---|---|---|---|
| 10,013,446 B2 | 7/2018 | Rana et al. | |
| 10,255,301 B2* | 4/2019 | Bell et al. | G06F 17/30289 |
| 10,268,708 B2 | 4/2019 | Rana et al. | |
| 10,324,935 B1* | 6/2019 | Patton | G06F 16/24575 |
| 10,331,631 B2 | 6/2019 | Michels et al. | |
| 10,353,934 B1* | 7/2019 | Mehta et al. | G06F 16/3329 |
| 10,397,757 B1* | 8/2019 | Gratton et al. | H04W 4/185 |
| 10,459,896 B2 | 10/2019 | Rana et al. | |
| 10,484,856 B1* | 11/2019 | Leung et al. | H04W 4/90 |
| 10,579,600 B2* | 3/2020 | Bell et al. | G06F 16/21 |
| 2001/0036224 A1 | 11/2001 | Demello et al. | |
| 2002/0138571 A1 | 9/2002 | Trinon et al. | |
| 2002/0188581 A1 | 12/2002 | Fortin et al. | |
| 2003/0036848 A1 | 2/2003 | Sheha et al. | |
| 2003/0135486 A1 | 7/2003 | Edlund et al. | |
| 2003/0204484 A1 | 10/2003 | Charpiot et al. | |
| 2004/0181526 A1 | 9/2004 | Burdick et al. | |
| 2004/0185863 A1 | 9/2004 | Ogami | |
| 2004/0254920 A1 | 12/2004 | Brill et al. | |
| 2005/0073708 A1 | 4/2005 | Oh et al. | |
| 2005/0096997 A1 | 5/2005 | Jain et al. | |
| 2005/0134935 A1 | 6/2005 | Schmidtler et al. | |
| 2005/0240580 A1 | 10/2005 | Zamir et al. | |
| 2006/0004850 A1 | 1/2006 | Chowdhury | |
| 2006/0085177 A1 | 4/2006 | Toyama et al. | |
| 2006/0195565 A1 | 6/2006 | De-Poorter | |
| 2006/0149774 A1 | 7/2006 | Egnor | |
| 2006/0248106 A1 | 11/2006 | Milne et al. | |
| 2006/0253481 A1 | 11/2006 | Guido et al. | |
| 2006/0277197 A1 | 12/2006 | Bailey | |
| 2006/0287810 A1 | 12/2006 | Sadri et al. | |
| 2007/0005556 A1 | 1/2007 | Ganti et al. | |
| 2007/0030824 A1 | 2/2007 | Ribaudo et al. | |
| 2007/0072582 A1 | 3/2007 | Nurmi | |
| 2007/0088603 A1 | 4/2007 | Jouppi et al. | |
| 2007/0100796 A1 | 5/2007 | Wang | |
| 2007/0149216 A1 | 6/2007 | Misikangas | |
| 2007/0245118 A1 | 10/2007 | Suponau et al. | |
| 2007/0256006 A1 | 11/2007 | Meyers | |
| 2008/0077314 A1 | 3/2008 | Ishikawa | |
| 2008/0248815 A1 | 10/2008 | Busch | |
| 2009/0005968 A1 | 1/2009 | Vengroff et al. | |
| 2009/0024546 A1 | 1/2009 | Ficcaglia et al. | |
| 2009/0089149 A1 | 4/2009 | Lerner et al. | |
| 2009/0106228 A1 | 4/2009 | Weinman, Jr. | |
| 2009/0119222 A1 | 5/2009 | O'Neil et al. | |
| 2009/0124241 A1 | 5/2009 | Krishnaswamy et al. | |
| 2009/0125321 A1 | 5/2009 | Charlebois et al. | |
| 2009/0132469 A1 | 5/2009 | White et al. | |
| 2009/0132605 A1 | 5/2009 | Nielsen | |
| 2009/0207021 A1 | 8/2009 | Naccache | |
| 2009/0254838 A1 | 10/2009 | Rao et al. | |
| 2009/0280829 A1 | 11/2009 | Feuerstein | |
| 2009/0282019 A1 | 11/2009 | Galitsky et al. | |
| 2009/0287405 A1 | 11/2009 | Liu et al. | |
| 2009/0299952 A1 | 12/2009 | Zheng et al. | |
| 2009/0302952 A1 | 12/2009 | Chan et al. | |
| 2009/0319346 A1 | 12/2009 | Fogel et al. | |
| 2010/0023515 A1 | 1/2010 | Marx | |
| 2010/0323715 A1 | 2/2010 | Winters | |
| 2010/0079336 A1 | 4/2010 | Skibiski et al. | |
| 2010/0185628 A1 | 7/2010 | Weda et al. | |
| 2010/0214117 A1 | 8/2010 | Hazzani | |
| 2011/0029853 A1 | 2/2011 | Garrity et al. | |
| 2011/0137834 A1* | 6/2011 | Ide et al. | 706/12 |
| 2011/0145228 A1 | 6/2011 | Laurenzo | |
| 2011/0208427 A1 | 8/2011 | Jansen et al. | |
| 2011/0219226 A1 | 9/2011 | Olsson et al. | |
| 2011/0246059 A1 | 10/2011 | Feuerstein | |
| 2011/0313969 A1 | 12/2011 | Ramu | |
| 2011/0320319 A1 | 12/2011 | Streich | |
| 2012/0028650 A1 | 2/2012 | Cooper et al. | |
| 2012/0031032 A1 | 2/2012 | Deiss et al. | |
| 2012/0047102 A1 | 2/2012 | Petersen et al. | |
| 2012/0047184 A1 | 2/2012 | Purdy | |
| 2012/0066218 A1 | 3/2012 | Rapp et al. | |
| 2012/0084280 A1 | 4/2012 | Bouzas et al. | |
| 2012/0100869 A1 | 4/2012 | Liang et al. | |
| 2012/0110183 A1 | 5/2012 | Miranda et al. | |
| 2012/0182144 A1 | 7/2012 | Richardson et al. | |
| 2012/0185439 A1 | 7/2012 | Chen et al. | |
| 2012/0185455 A1 | 7/2012 | Hedrevich | |
| 2012/0191696 A1 | 7/2012 | Renkes et al. | |
| 2012/0221231 A1 | 8/2012 | Nagata et al. | |
| 2012/0221508 A1 | 8/2012 | Chaturvedi et al. | |
| 2012/0226622 A1 | 9/2012 | Gonzalez et al. | |
| 2012/0253862 A1 | 10/2012 | Davidson | |
| 2012/0260209 A1 | 10/2012 | Stibel et al. | |
| 2012/0278767 A1 | 11/2012 | Stibei et al. | |
| 2012/0303745 A1 | 11/2012 | Lo et al. | |
| 2012/0317110 A1 | 12/2012 | Butterfield et al. | |
| 2012/0331014 A1 | 12/2012 | Skubacz et al. | |
| 2013/0031032 A1 | 1/2013 | Mehta et al. | |
| 2013/0066866 A1 | 3/2013 | Chan et al. | |
| 2013/0066912 A1 | 3/2013 | Chetuparambil et al. | |
| 2013/0073581 A1 | 3/2013 | Sandholm | |
| 2013/0090130 A1 | 4/2013 | Burrell et al. | |
| 2013/0103306 A1 | 4/2013 | Uetake | |
| 2013/0103607 A1 | 4/2013 | Knipfer et al. | |
| 2013/0103697 A1 | 4/2013 | Hill et al. | |
| 2013/0103764 A1 | 4/2013 | Verkasalo | |
| 2013/0157693 A1 | 6/2013 | Mercuri et al. | |
| 2013/0183998 A1 | 7/2013 | Pylappan et al. | |
| 2013/0210463 A1 | 8/2013 | Busch | |
| 2013/0226857 A1 | 8/2013 | Shim et al. | |
| 2013/0227026 A1 | 8/2013 | Jayaram et al. | |
| 2013/0238540 A1 | 9/2013 | O'Donaghue et al. | |
| 2013/0246175 A1 | 9/2013 | Bilange et al. | |
| 2013/0250851 A1 | 9/2013 | Lakhzouri et al. | |
| 2013/0262479 A1 | 10/2013 | Liang et al. | |
| 2013/0267255 A1 | 10/2013 | Liu et al. | |
| 2013/0304758 A1 | 11/2013 | Gruber et al. | |
| 2013/0346347 A1 | 12/2013 | Patterson et al. | |
| 2014/0115009 A1 | 4/2014 | Lashley et al. | |
| 2014/0128105 A1 | 5/2014 | Su et al. | |
| 2014/0180597 A1* | 6/2014 | Brown et al. | A61B 5/4012 |
| 2014/0270402 A1 | 9/2014 | Condell et al. | |
| 2014/0274022 A1 | 9/2014 | Bell et al. | |
| 2014/0274154 A1 | 9/2014 | Rana et al. | |
| 2014/0278838 A1 | 9/2014 | Novak | |
| 2014/0279674 A1 | 9/2014 | Michels et al. | |
| 2014/0279757 A1 | 9/2014 | Shimanovsky et al. | |
| 2014/0279811 A1 | 9/2014 | Su et al. | |
| 2014/0289188 A1 | 9/2014 | Shimanovsky et al. | |
| 2015/0081717 A1 | 3/2015 | Pidduck | |
| 2015/0319574 A1 | 11/2015 | Wachter et al. | |
| 2016/0232192 A1 | 8/2016 | Shimanovsky et al. | |
| 2016/0366547 A1* | 12/2016 | Hodges et al. | H04W 4/02 |
| 2017/0206223 A1 | 7/2017 | Bell et al. | |
| 2018/0011888 A1 | 1/2018 | Rana et al. | |

FOREIGN PATENT DOCUMENTS

| | | |
|---|---|---|
| WO | WO 2014/145059 A2 | 9/2014 |
| WO | WO 2014/145069 A1 | 9/2014 |
| WO | WO 2014/145076 A2 | 9/2014 |
| WO | WO 2014/145088 A1 | 9/2014 |
| WO | WO 2014/145104 A2 | 9/2014 |
| WO | WO 2014/145106 A1 | 9/2014 |

OTHER PUBLICATIONS

International Search Report and Written Opinion issued by ISA Application No. PCT/US14/029787 dated Aug. 13, 2014, 9 pages.

Franklin, Michael J., et al. "CrowdDB: answering queries with crowdsourcing." Proceedings of the 2011 ACM SIGMOD.

International Preliminary Report on Patentability for International Application No. PCT/US14/029737 dated Sep. 15, 2015, 7 pages.

Smiley, D. "Lucene 4 Spatial," 2012 Basis Technology, Open Source Conference, Oct. 2, 2012, 16 pages.

International Preliminary Report and Written Opinion for International Application No. PCT/US14/029755 dated Aug. 27, 2014, 10 pages.

(56) References Cited

OTHER PUBLICATIONS

Communication pursuant to Rules 161(2) and 162 EPC for European Application No. 14720407.7-1854, dated Nov. 10, 2015, 2 pages.
Communication pursuant to Rules 161(2) and 162 EPC for European Application No. 14720841.7-1951, dated Oct. 30, 2015, 2 pages.
Communication pursuant to Rules 161(2) and 162 EPC for European Application No. 14727983.0-1951, dated Dec. 22, 2015, 2 pages.
Communication pursuant to Rules 161(2) and 162 EPC for European Application No. 14730242.6-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.0-1951, dated Oct. 30, 2015, 2 pages.
Response to Communication pursuant to Rules 161(2) and 162 EPC for European Application No. 14720407.7-1854, dated May 10, 2016, 3 pages.
Claims for Response to Communication pursuant to Rules 161(2) and 162 EPC for European Application No. 14720407.7-1854, dated May 10, 2016, 4 pages.
Response to Communication pursuant to Rules 161(2) and 162 EPC for European Application No. 14720841.7, dated Apr. 29, 2016, 9 pages.
Varma, H.P. et al., "A Data Structure for Spatio-Temporal Databases," International Hydrographic Review, Monaco, vol. 67, Issue 1, XP000565997, Jan. 1990, pp. 71-92.
Specification for Response to Communication pursuant to Rules 161(2) and 162 EPC for European Application No. 14720841.7, dated Apr. 29, 2016, 2 pages.
European Search Report for European Application No. 14720841.7, dated Oct. 6, 2016, 7 pages.
European Search Report for European Application No. 14727983.0-1955, dated Dec. 8, 2016, 9 pages.
Response to Communication pursuant to Rules 161(2) and 162 EPC for European Application No. 14725817.2, dated Jul. 11, 2016, 2 pages.
Claims for Response to Communication pursuant to Rules 161(2) and 162 EPC for European Application No. 14725817.2, dated Jul. 11, 2016, 4 pages.
Claims and Response to Communication pursuant to Rules 161(2) and 162 EPC for European Application No. 14725818.0, dated Apr. 29, 2016, 9 pages.
Communication pursuant to Article 94(3) EPC for European Application No. 14730242.6, dated Nov. 14, 2016, 4 pages.
Claims and Response to Communication pursuant to Rules 161(2) and 162 EPC for European Application No. 14727983.0, dated Jun. 23, 2016, 10 pages.
Response to Communication pursuant to Article 94(3) EPC for European Application No. 14730242.6, dated Mar. 15, 2017, 12 pages.
Italiano, et al., "Synchronization Options for Data Warehouse Designs," Computer, IEEE Computer Society, Mar. 2006, pp. 53-57.
Search Report and Written Opinion for International Application No. PCT/US14/029787 dated Sep. 18, 2014, 7 pages.
International Preliminary Report on Patentability for International Application No. PCT/US14/029767 dated Sep. 15, 2015, 4 pages.
Search Report and Written Opinion for International Application No. PCT/US14/029713 dated Nov. 5, 2014, 7 pages.
Search Report and Written Opinion for International Application No. PCT/US14/029784 dated Dec. 17, 2014, 7 pages.
International Preliminary Report on Patentability for International Application No. PCT/US14/029784 dated Sep. 15, 2015, 6 pages.
Search Report and Written Opinion for International Application No. PCT/US14/029755 dated Sep. 18, 2014, 6 pages.
International Preliminary Report on Patentability for International Application No. PCT/US14/029755 dated Sep. 15, 2015, 5 pages.
International Preliminary Report on Patentability for International Application No. PCT/US14/029713 dated Sep. 15, 2015, 6 pages.
Search Report and Written Opinion for International Application No. PCT/US14/029737 dated Dec. 9, 2014, 6 pages.
Xuan Liu et al., "CDAS: A Crowdsourcing Data Analytics System", Proceedings of the VLDB Endowment, vol. 5. No. 10, pp. 1040-1051.
Wilson Wong, et al. "Ontology Learning from Text: A Look Back and Into the Future"; ACM Comouting Surveys (CSUR); vol. 44; Issue 4; Article No. 20; Aug. 2012; pp. 20.1-20.36.
Juan Ramos, "Using TF-IDF to Determine Word Relevance in Document Queries", The First Instructional Conference on Machine Learning (ICML-2003), proceedings of, Dec. 3, 2003, pp. 1-4.
Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.
Marti A. Hearst and Jan 0. Pedersen, "Reexamining the Cluster Hypothesis: Scatter/Gather on Retrieval Results", SIGIR '96 Proceedings of the 19th annual international ACM SIGIR conference on Research and development in information retrieval, Aug. 18, 1996, pp. 76-84.
Stanislaw Osi'nski and Dawid Weiss, "A Concept-driven Algorithm for Clustering Search Results", IEEE Intelligent Systems, vol. 20, Issue 3, Jun. 13, 2005, pp. 48-54.
Tian, M. et al., "Efficient algorithms for fast integration on large data sets from multiple sources," BMC Medical Informatics and Decision Making, vol. 12, No. 1, 6 pages (Jun. 28, 2012).
Ahmed Metwally, Christos Faloutsos, "V-SMART-Join: A Scalable MapReduce Framework for All-Pair Similarity Joins of Multisets and Vectors," Journal Proceedings of the VLDB Endowment, vol. 5 Issue 8, Apr. 2012, pp. 704-715.
Anonymous, "SpatialPrefixTree (Lucene 4.0.0 api)," https://web.archive.org/web/20130313072002/http://lucene.apache.org/core/4_0_0/spatial/org/apache/lucene/spatial/prefix/tree/SpatialPrefixTree.html Accessed on Jul. 17, 2017, Published on Mar. 13, 2013, 4 pages.
Oosterom, V. P. et al., "The Spatial Location Code," Proceedings of the International Symposium on Spatial Datahandling, XP-002293525, Aug. 12, 1996, 12 pages.
Samet, H. "Hierarchical Spatial Date Structures," Computer Science Department, Center for Automation Research and Institute for Advanced Computer Studies, University of Maryland, XP-002566914, Jul. 17, 1989, pp. 193-212.
R. Baragalia, G. De Francisci Morales, C. Lucchese, "Document Similarity Self-Join with Map-Reduce," Data Mining (ICDM), 2010 IEEE 10th International Conference on Dec. 13, 2010, pp. 731-736.
Lars Kolb et al., "Learning-based entity resolution with MapReduce," Proceeding CloudDB '11 Proceedings of the third international workshop on Cloud data management, Oct. 24, 2011, pp. 1-6.
Qiaozhu Mei et al., "Automatic Labeling of Multinomial Topic Models," KDD '07 Proceedings of the 13th ACM SIGKDD International conference on Knowledge discovery and data mining, Aug. 12, 2007, pp. 490-499.
EP Examination Report EP14725817.2 dated Jul. 17, 2018.
Supplementary European Search Report/Opinion EP18179405, dated Aug. 27, 2018, 9 pages.
Michael J Cafarella: "Extracting and Querying a Comprehensive Web Database", Jan. 1, 2009, pp. 1-7 XP055500317, URL:https://database.cs.wisc.edu/cidr/cidr.
Sebastian Hellmann et al.: "DBpedia Live Extraction", Nov. 1, 2009 (Nov. 1, 2009), On the Move to Meaningful Internet Systems: Otm 2009, Springer Berlin Heidelberg, Berlin, Heidelberg, p. 1209-1223.
Anonymous: "Record linkage—Wkipedia", 1-15 Mar. 13, 2013 (Mar. 13, 2013). XP055500110, URL:https://en.wikipedia.org/w/index.php?title=Record_linkage&oldid=543842434.

(56) References Cited

OTHER PUBLICATIONS

Breese, John S., David Heckerman, and Carl Kadie. "Empirical analysis of predictive algorithms for collaborative filtering," Proceedings of the Fourteenth conference on Uncertainty in artificial intelligence. Morgan Kaufmann Publishers Inc., 1998, pp. 43-52.
Wang, Cong, et al. "Achieving usable and privacy-assured similarity search over outsourced cloud data." INFOCOM, 2012, Proceedings IEEE. IEEE, 2012.
Andrei Tamilin et al, Context-aware Mobile Crowdsourcing, PN153073, UBICOMP, 12, pp. 1-4 Sep. 8, 2012.
Office Action,Chinese Patent Application No. 201480014828.0, with EnglishTranslation, dated Jan. 2, 2019.
Geohash, Wikipedia, the :flee encyclopedia, Jun. 16, 2014, 6 pages http://en.wikipedia org/w/index.php?title=Geohash&oldid=52302473.

* cited by examiner

| Time and Location of John Doe's Mobile Phone | Session | Cluster |
|---|---|---|
| 10:00 AM / 200 Main Street | Session 1 | Cluster 1 |
| 10:01 AM / 202 Main Street | Session 1 (close enough in time and space to resolve to same session) | Cluster 1 |
| 10:02 AM / 200 Main Street | Session 1 (close enough in time and space to resolve to same session) | Cluster 1 |
| 10:30 AM / 200 Main Street | Session 2 (even though location remained the same, a new session was started because the temporal limit of session 1 was reached) | Cluster 1 (Sessions 1 and 2 are grouped into the same cluster because they occurred at the same location) |
| 11:00 AM / 800 Cedar Street | Session 3 (new session started because both temporal and geographic limits of prior session were exceeded) | Cluster 2 (new cluster because the geographic location is new) |
| 11:05 PM / 400 Walnut Street | Session 4 (new session started because both temporal and geographic limits of prior session were exceeded) | Cluster 3 (new cluster because the geographic location is new) |
| 12:00 / 200 Main Street | Session 5 (new session started because both temporal and geographic limits of prior session were exceeded) | Cluster 1 (Session 5 is grouped with sessions 1 and 2 because they all occurred at the same location) |

FIG. 8

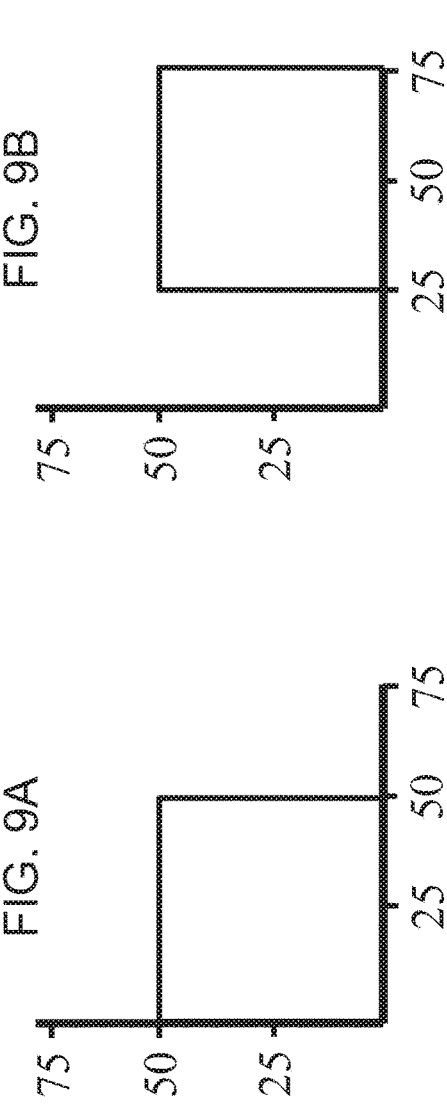
FIG. 9A
FIG. 9B
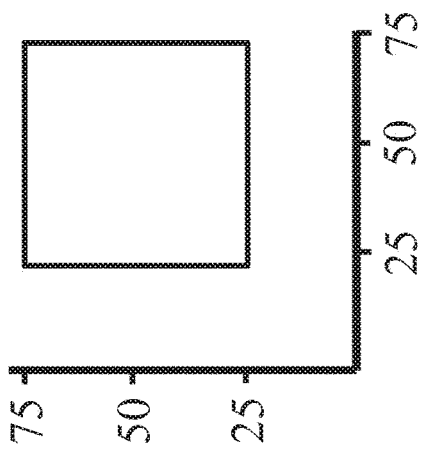
FIG. 9C
FIG. 9D
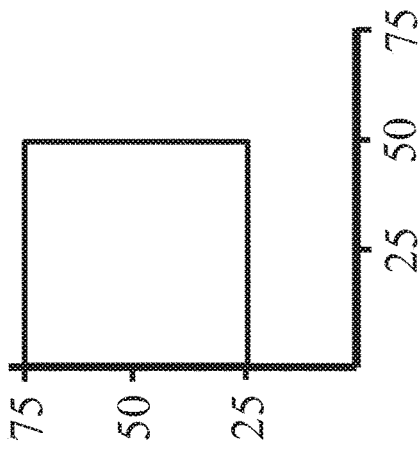

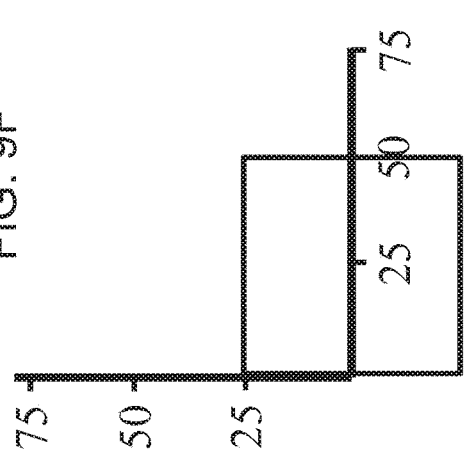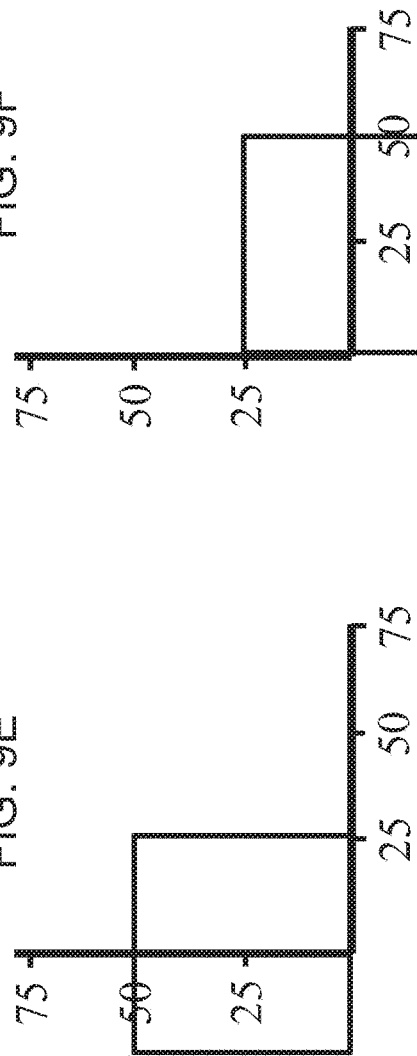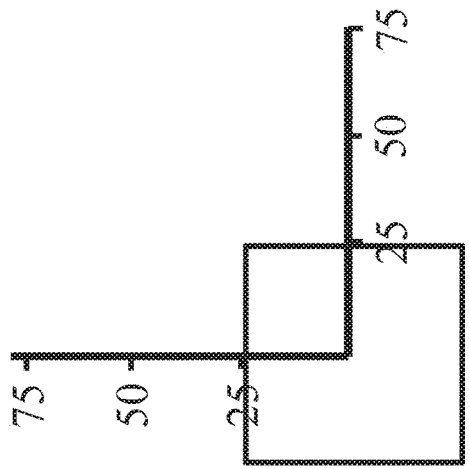

```
"aoa": [
    {
        "aoa_id": "9l277fd3-901c-4b1f-8214-ee7887d955ae",
        "centroid": {
            "latitude": 28.55432,
            "longitude": -82.521234
        },
        "commercial_density": 0.04,
        "postcode": "34613",
        "rank": 1,
        "type": "away"
    }
]
```

FIG. 10

```
"home": {
    "centroid": {
        "latitude": 130.15,
        "longitude": 110.1
    },
    "commercial_residential": {
        "business": 4.6,
        "residential": 81.1,
        "unknown": 14.3
    },
    "postcode": "95008"
}
```

FIG. 11

```
"countries":[{"name": "us",
    "context": "United States",
    "factual_id" : "08d549a4-8f76-11e1-848f-cfd5bf3ef515",
    "score" : 1,
    "location": {"latitude": 38.915411, "longitude": 34.1202}
}],
"regions":[{"name": "PA",
    "context": "Pennsylvania, United States",
    "factual_id" : "08d549a4-8f76-11e1-848f-cfd5bf3ef515",
    "score" : 1,
    "location": {"latitude": 40.994709, "longitude": -77.604538}
}],
"localities":[{"name": "Philadelphia",
    "context": "Philadelphia, Pennsylvania, United States",
    "factual_id" : "0898f288-8f76-11e1-848f-cfd5bf3ef515",
    "score" : 1,
    "location": {"latitude": 39.15893, "longitude": -91.01033}},
{"name": "Wayne",
    "context": "Wayne, Montgomery, Pennsylvania, United States",
    "factual_id" : "08cfa17a-8f76-11e1-848f-cfd5bf3ef515",
    "score" : 2,
    "location": {"latitude": 39.771778, "longitude": -80.234734}
}]
```

FIG. 12

```
"dmas":[
    {
        "id",532,
        "name":"ALBANY - SCHENECTADY - TROY",
        "score": 1
    },
],
```

FIG. 13A

```
"metros":[
    {
        "id": 45300,
        "name": "Tampa-St. Petersburg-Clearwater, FL",
        "score": 1
    },
],
```

FIG. 13B

```
"demographics": {
    "income": {
        "value": 55436,
        "score":0.79128
    },
    "gender": {
        "male" : {"score":0.79128},
        "female" : {"score":0.3012}
    },
    "age": {
        "13-17" : {"score":0.35},
        "18-24" : {"score":0.72}
    },
    "family": {
        "mom": {"score":0.2134},
        "dad" : {"score":0.3243},
        "parent": {"score":0.79128}
    },
    "race": {
        "hispanic" : {"score":0.79128},
        "african_american" : {"score":0.00121}
    },
```

FIG. 14

```
"behavioral": {
    "electronics_buyer": {
        "score": 0.6834
    },
    "healthcare_provider": {
        "score": 0.887
    },
    "golfer": {
        "score": 0.713
    },
    "moviegoer": {
        "score": 0.79128
    }
}
```

FIG. 15

| | |
|---|---|
| Residence | Santa Monica, CA |
| Workplace | Beverly Hills, CA |
| Commute hours | 8AM-9AM, 6PM-7PM |
| Income | $60-100k per year |
| Top Chains | Coffee Bean, Ralph's, In-N-Out, Target, Whole Foods |
| Additional information | Business Traveler<br>Apartment owner<br>In the market for a new care |

FIG. 16

APPARATUS, SYSTEMS, AND METHODS FOR ANALYZING MOVEMENTS OF TARGET ENTITIES

CROSS REFERENCE TO RELATED APPLICATIONS

This application is a continuation of U.S. application Ser. No. 16/352,664, filed Mar. 13, 2019, which is a continuation of U.S. application Ser. No. 15/960,322, filed Apr. 23, 2018, which is a continuation of U.S. application Ser. No. 15/420,655, filed Jan. 31, 2017, now U.S. Pat. No. 9,977,792, which is a continuation of U.S. application Ser. No. 14/214,208, filed Mar. 14, 2014, now U.S. Pat. No. 9,594,791, which claims benefit of the earlier filing date, under 35 U.S.C. § 119(c), of:
  U.S. Provisional Application No. 61/799,986, filed on Mar. 15, 2013, entitled "SYSTEM FOR ANALYZING AND USING LOCATION BASED BEHAVIOR";
  U.S. Provisional Application No. 61/800,036, filed on Mar. 15, 2013, entitled "GEOGRAPHIC LOCATION DESCRIPTOR AND LINKER";
  U.S. Provisional Application No. 61/799,131, filed on Mar. 15, 2013, entitled "SYSTEM AND METHOD FOR CROWD SOURCING DOMAIN SPECIFIC INTELLIGENCE";
  U.S. Provisional Application No. 61/799,846, filed Mar. 15, 2013, entitled "SYSTEM WITH BATCH AND REAL TIME DATA PROCESSING"; and
  U.S. Provisional Application No. 61/799,817, filed on Mar. 15, 2013, entitled "SYSTEM FOR ASSIGNING SCORES TO LOCATION ENTITIES."
This application is also related to:
  U.S. patent application Ser. No. 14/214,296, filed on Mar. 14, 2014, entitled "APPARATUS, SYSTEMS, AND METHODS FOR PROVIDING LOCATION INFORMATION";
  U.S. patent application Ser. No. 14/214,213, filed on Mar. 14, 2014, entitled "APPARATUS, SYSTEMS, AND METHODS FOR CROWDSOURCING DOMAIN SPECIFIC INTELLIGENCE";
  U.S. patent application Ser. No. 15/132,228, filed on Apr. 18, 2016, entitled "APPARATUS, SYSTEMS, AND METHODS FOR BATCH AND REALTIME DATA PROCESSING";
  U.S. patent application Ser. No. 14/214,309, filed on Mar. 14, 2014, entitled "APPARATUS, SYSTEMS, AND METHODS FOR ANALYZING CHARACTERISTICS OF ENTITIES OF INTEREST" and
  U.S. patent application Ser. No. 14/214,231, filed on Mar. 14, 2014, entitled "APPARATUS, SYSTEMS, AND METHODS FOR GROUPING DATA RECORDS."

The entire content of each of the above-referenced applications (including both the provisional applications and the non-provisional applications) is herein incorporated by reference.

FIELD OF THE INVENTION

The present disclosure generally relates to data processing apparatus, systems, and methods for analyzing movements of target entities.

BACKGROUND

Many service providers have access to location information of many mobile devices. The service providers are in communication with mobile devices that are equipped with a geo-location system, such as a Global Positioning System (GPS), configured to determine the location of the associated mobile device, and these mobile devices can share their location information with the service providers. The location information can be useful for service providers because the service providers can adapt the service based on the location of the mobile devices. For example, mobile application that recommends restaurants can re-rank a list of recommended restaurants based on the determined location of the mobile device running that application.

While the use of location information has increased significantly in recent years, the use of location information is still quite limited. The location information is often deemed a time-independent measurement. Therefore, although service providers adapt their services based on the location of the mobile device at a particular time instance, the service providers largely ignore the path over which the mobile device has travelled over a period of time. Thus, the service providers largely ignore the rich contextual information embedded in the location information. There is a need to provide efficient mechanisms for extracting rich contextual information embedded in the location information.

SUMMARY

In general, in an aspect, embodiments of the disclosed subject matter can include an apparatus. The apparatus includes one or more interfaces configured to provide communication with a computing device. The apparatus also includes a processor in communication with the one or more interfaces. The processor is configured to run one or more modules that are operable to cause the apparatus to receive, from the computing device, a time-series of location data points corresponding to a target entity, determine one or more attributes associated with the target entity based on the time-series of location data points, and provide a profile of the target entity based on the one or more attributes associated with the target entity.

In general, in an aspect, embodiments of the disclosed subject matter can include a method. The method can include receiving, by a first computing device from a second computing device, a time-series of location data points corresponding to a target entity, determining, by the first computing device, one or more attributes associated with the target entity based on the time-series of location data points corresponding to the target entity, and providing, by the first computing device, a profile of the target entity based on the one or more attributes associated with the target entity.

In general, in an aspect, embodiments of the disclosed subject matter can include a non-transitory computer readable medium. The non-transitory computer readable medium can include executable instructions operable to cause a data processing apparatus to receive, from a computing device in communication with the data processing apparatus, a time-series of location data points corresponding to a target entity, determine one or more attributes associated with the target entity based on the time-series of location data points corresponding to the target entity, and provide a profile of the target entity based on the one or more attributes associated with the target entity.

In any one of the embodiments disclosed herein, the apparatus, the method, or the non-transitory computer readable medium can include modules, steps, or executable instructions for determining an accuracy of the time-series of location data points, and discard, based on the determined accuracy, one or more of the location data points in the time-series of location data points.

In any one of the embodiments disclosed herein, the apparatus, the method, or the non-transitory computer readable medium can include modules, steps, or executable instructions for determining the accuracy of the time-series of location data points based on a time-series of location data points associated with other target entities.

In any one of the embodiments disclosed herein, the apparatus, the method, or the non-transitory computer readable medium can include modules, steps, or executable instructions for determining the accuracy of the time-series of location data points at a particular time instance based on location information associated with other target entities at the particular time instance.

In any one of the embodiments disclosed herein, the apparatus, the method, or the non-transitory computer readable medium can include modules, steps, or executable instructions for determining one or more sessions from the time-series of location data points by grouping one or more of the time-series of location data points that are bounded in space and/or time, and determining the one or more attributes associated with the target entity based on the one or more sessions.

In any one of the embodiments disclosed herein, the apparatus, the method, or the non-transitory computer readable medium can include modules, steps, or executable instructions for determining one or more sessions from the time-series of location data points by grouping one or more of the time-series of location data points that are bounded in space and/or time, determining one or more clusters based on the one or more sessions based on a physical proximity between sessions, and determining the one or more attributes associated with the target entity based on the one or more sessions and the one or more clusters.

In any one of the embodiments disclosed herein, the apparatus, the method, or the non-transitory computer readable medium can include modules, steps, or executable instructions for associating one of the location data points, the sessions, or the clusters with annotation information associated with a geographical location of the location data points, sessions, or clusters, and using the annotation information to determine the one or more attributes associated with the target entity.

In any one of the embodiments disclosed herein, the apparatus, the method, or the non-transitory computer readable medium can include modules, steps, or executable instructions for determining the one or more attributes associated with the target entity based on movements of the target entity between two or more clusters.

In any one of the embodiments disclosed herein, the apparatus, the method, or the non-transitory computer readable medium can include modules, steps, or executable instructions for determining a home location attribute based on, at least in part, statistical measures on the movements of the target entity and the annotation information associated with the target entity.

In any one of the embodiments disclosed herein, the apparatus, the method, or the non-transitory computer readable medium can include modules, steps, or executable instructions for determining a home location attribute based on, at least in part, a likelihood that a particular location is associated with a residence.

In any one of the embodiments disclosed herein, the apparatus, the method, or the non-transitory computer readable medium can include modules, steps, or executable instructions for determining a home location attribute based on, at least in part, timestamps of location data points associated with the target entity.

In any one of the embodiments disclosed herein, the apparatus, the method, or the non-transitory computer readable medium can include modules, steps, or executable instructions for receiving the time-series of location data points in a batch mode, wherein the computing device is a server operated by a service provider.

In any one of the embodiments disclosed herein, the apparatus, the method, or the non-transitory computer readable medium can include modules, steps, or executable instructions for receiving the time-series of location data points in a streaming mode, wherein the computing device is the target entity.

In any one of the embodiments disclosed herein, the apparatus, the method, or the non-transitory computer readable medium can include modules, steps, or executable instructions for determining a predictive model based on the one or more attributes, wherein the predictive model is configured to predict a behavior of the target entity in a future.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the disclosed subject matter, the scope of which is set forth in the claims that follow.

FIG. 8 illustrates an example of how location data points are grouped into sessions and how sessions are grouped into clusters in accordance with some embodiments.

FIGS. 9A-9G illustrate such a division for a small geographic area in accordance with some embodiments.

FIG. 10 illustrates a geographic attribute of a profile of a target entity in accordance with some embodiments.

FIG. 11 illustrates a home location attribute of a profile of a target entity in accordance with some embodiments.

FIG. 12 illustrates a list of location entities provided in a profile of a target entity in accordance with some embodiments.

FIGS. 13A-13B illustrate the DMA attribute and the Metro attribute of a profile of a target entity in accordance with some embodiments.

FIG. 14 illustrates demographic attributes of a profile of a target entity in accordance with some embodiments.

FIG. 15 illustrates behavioral attributes of a profile of a target entity in accordance with some embodiments.

FIG. 16 illustrates a profile of a target entity in a tabular form in accordance with some embodiments.

DESCRIPTION OF THE DISCLOSED SUBJECT MATTER

Figure 1:
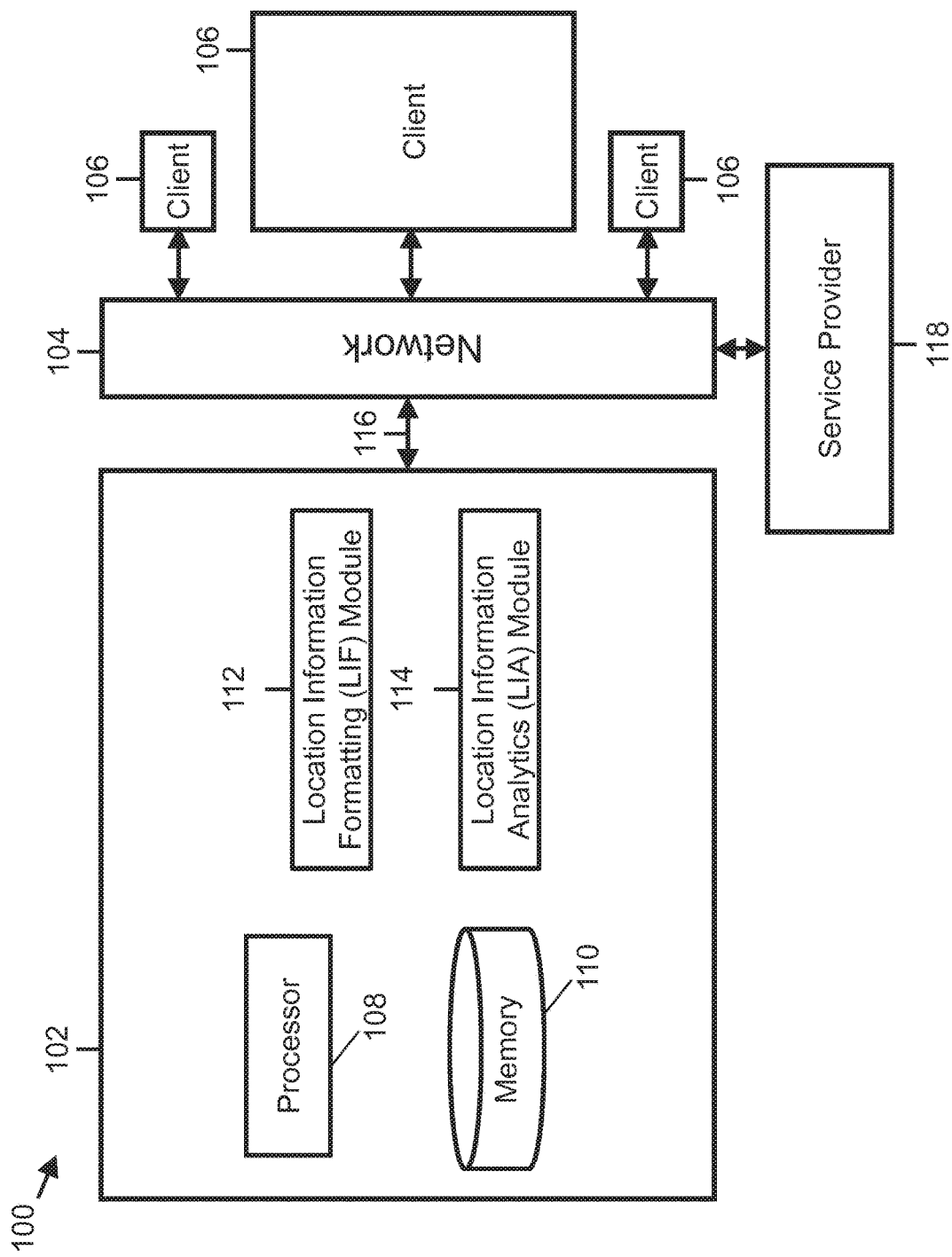
FIG. 1 illustrates a diagram of a location information analytics system in accordance with some embodiments.

The present disclosure relates to apparatus, systems, and methods for providing a location information analytics mechanism. The location information analytics mechanism is configured to analyze location information to extract contextual information (e.g., profile) about a mobile device or a user of a mobile device, collectively referred to as a target entity. At a high level, the location information analytics mechanism can include analyzing location data points associated with a target entity to determine features associated with the target entity, and using the features to predict attributes associated with the target entity. The set of predicted attributes can form a profile of the target entity.

More particularly, the location information analytics mechanism can analyze a time-series of location information (also referred to as location data points, or simply as location information). Location information can include a geospatial coordinate, an address, or any location identifier that is capable of identifying a location. The location information analytics mechanism can analyze the time-series of location information, such as a time series of geospatial coordinates produced by a target entity, to determine characteristics (e.g., features) associated with the target entity. Subsequently, the location information analytics mechanism can use the determined features of the target entity to determine one or more profiles of the target entity. A profile can include a set of high level attributes that describes a target entity, including categorizations based on the target entity's behavior. For example, the location information analytics mechanism can generate a profile, indicating that a particular mobile device is used by a person that has a primary residence in Beverly Hills, Calif., and has a primary work place in Los Angeles, Calif. The profile can be used by service providers, such as publishers and developers that serve content on a target entity, to personalize their applications and customize their content to the target entity.

In some embodiments, a feature of an entity used by the location information analytics mechanism can include temporally independent information about an entity (or a user of an entity). For example, a feature can indicate that a user of a mobile device often visits a primary school, that the user often visits a shopping mall, and that the user's apartment is located near Los Angeles, Calif. The feature of an entity can also provide temporal relationships between temporally independent information. Referring to the example provided above, the feature can indicate that the user of the mobile device visit the school attended by the user's child in the morning, that the user subsequently visits a shopping mall, that the user returns to the school attended by the user's child in the afternoon, and that the user subsequently returns to the user's apartment near Los Angeles. The location information analytics mechanism can use these features to predict information about the user, for example, that the user does not work full-time during the day.

In some embodiments, the profile can be used by service providers to predict future behaviors of the target entity, and provide adapted services to the target entity based on the predicted future behaviors. For example, the location information analytics mechanism can use one or more profiles to generate a predictive model that can predict the location and/or the type of locations/venues that a corresponding target entity may be located at any given time. These profiles can also be combined to determine the characteristics of a group of target entities as a whole.

In some embodiments, the disclosed location information analytics mechanism can efficiently determine the one or more profiles of a target entity by representing a time-series of location information using sessions and clusters. A time-series of location information includes a sequence of location data points measured typically at successive temporal points. In some cases, the successive temporal points can be uniformly spaced; in other cases, the successive temporal points can be non-uniformly spaced. The disclosed location information analytics mechanism can segment the time-series of location information to generate sessions and clusters. For example, the location information analytics mechanism can group (or segment) geospatial coordinates into sessions, and group the sessions into clusters. Such session and cluster-based representation of the time-series of location information can obviate the need to re-compute or reprocess all the entire time-series of location information when additional location information for new time instances are received.

In some embodiments, the disclosed location information analytics mechanism can associate location data points, sessions, and/or clusters of a target entity with annotation information, which may provide metadata about the location data points, sessions, and/or clusters. The annotation information can be one of the features used to determine attributes associated with the target entity. The annotation information can be received from external sources, such as a website, a database, or any source information to which the disclosed location information analytics mechanism has access.

In some embodiments, the disclosed location information analytics mechanism can provide a profile based on as few as 1 location data point. However, the accuracy and contents of the generated profile can improve as the number of location data points increases. Therefore, in some embodiments, the disclosed location information analytics mechanism can provide a profile based on more than 3 location data points, 5 location data points, 10 location data points, or any predetermined number of location data points.

In some embodiments, one or more attributes in the profile can be associated with a confidence score, indicating a confidence score or accuracy of the associated attributes. In some cases, the confidence score can range between 0 and 1. However, any other ranges can be used to represent the confidence score.

In some cases, where the disclosed location information analytics mechanism has access to a large number of location data points over a long period of time, the disclosed location information analytics mechanism can determine a time-dependent (or time-bracketed) profile of a target entity. For example, the disclosed location information analytics mechanism can determine that a user of a mobile device enjoys having late-night snacks at In-N-Out between 11 PM-1 AM around Los Angeles, Calif.

In some embodiments, the location information analytics mechanism can use one or more machine learning techniques to determine or refine attributes in one or more profiles. For example, if a particular attribute of a profile of a target entity is missing, then the location information analytics mechanism can fill in (or predict) the missing information based on known information about the target entity. In some embodiments this can be done using logistic regression. In other embodiments it can use other machine learning techniques such as but not limited to random forests, linear regression, hidden Markov models, and neural networks.

A machine learning technique, for the purpose of the location information analytics mechanism, can include any function that receives a collection of "training data" (for example, specified as rows, each of which contains multiple feature scalars and one or more target scalar), and produces an estimator or "model" that predicts the target value from input features for new rows of data not comprising the training data. The quality of the estimator can be measured as, for example, loosely speaking, its ability to predict a target value for new rows of data. For example, given examples of "golfers" and a set of annotated sessions for known "golfers" (i.e., the training data), the system may determine that "sessions on golf courses" strongly correlate to "golfers" and assign a value to the "sessions on golf courses" feature that results in a more optimal target value prediction for "golfer".

In practice, as many as millions of such features can interact to create a model to predict such targets. In some embodiments, the system can include machine learning techniques that cluster or group targets or profiles. In such cases, the system can include any function that receives a collection of data (for example specified as rows, each of which contains multiple feature scalars) and produces an estimator or "model" that predicts a cluster of targets. For example, such functions can help identify similar features (e.g. behavior patterns) that appears to form a group. This grouping can be used to suggest new target profiles that can be given a subsequent name (e.g. "cluster 123 of similar things" becomes "dive bar lovers" after a human interprets a common qualitative aspect that the cluster members possess). In addition, the grouping can be correlated to desired behavior or qualities (e.g. clicking on ads) and other members of the cluster can be flagged as desirable for advertisers (without necessarily interpreting what qualitative aspects make them so) and targeted for ads.

In some embodiments, the location information analytics mechanism can use a separate estimator for each profile (e.g., each behavioral segment). For example, the location information analytics mechanism can build feature scalars from observable attributes such as "number of visits to a restaurant per week", or "number of visits to Starbucks", and use a separate estimator for different variables, such as "user is a food connoisseur," or "user is especially affluent."

The location information analytics mechanism can optionally include an intelligent data processing mechanism for cleaning (or discarding) inaccurate location data points. Location data points can be intermittent and of varying quality. The quality of location information can vary due to a large variance in its source and accuracy. For example, the location information can be determined based on a large number of sources: the Internet Protocol (IP)-address of a mobile device, the cell tower to which a mobile device is attached, the WiFi access point to which a mobile device is attached, and/or a Global Positioning System (GPS) operating in the mobile device. However, the accuracy of the determined location information can vary significantly. The location information determined from the IP address of a mobile device is generally highly inaccurate, whereas the location information determined from the WiFi access point or the GPS is generally more accurate. To address this issue, the disclosed location information analytics mechanism incorporates a number of data verification techniques that cleans the location information on submission. Depending on the application, the location information analytics mechanism can discard, optionally, about 15-25% of location information as irrelevant to profile building. This data cleaning process can improve the accuracy of generated profiles of target entities.

FIG. 1 illustrates a diagram of a location information analytics system in accordance with some embodiments. The system 100 includes a server 102, a communication network 104, one or more client devices 106, and a service provider 118. The server 102 can include a processor 108, a memory device 110, a location information formatting (LIF) module 112, a location information analytics (LIA) module 114, and one or more interfaces 116.

The processor 108 of the server 102 can be implemented in hardware. The processor 108 can include an application specific integrated circuit (ASIC), programmable logic array (PLA), digital signal processor (DSP), field programmable gate array (FPGA), or any other integrated circuit. The processor 108 can also include one or more of any other applicable processors, such as a system-on-a-chip that combines one or more of a CPU, an application processor, and flash memory, or a reduced instruction set computing (RISC) processor. The memory device 110 of the processor 108 can include a computer readable medium, flash memory, a magnetic disk drive, an optical drive, a programmable read-only memory (PROM), and/or a read-only memory (ROM).

The LIF module 112 can be configured to receive a time series of location information of a target entity, for example, a temporal series of geo-location coordinates corresponding to a target entity's movement, and segment the time series of location information into sessions. Furthermore, the LIF module 112 can also group (or merge) two or more sessions into a cluster, and, optionally, add annotation information to sessions and/or clusters based on information from external data sources. In some embodiments, the LIF module 112 can extract, from geo-location coordinates associated with multiple target entities, all geo-location coordinates corresponding to a single target entity and generate sessions, clusters, and/or annotation information corresponding to the single target entity. In some embodiments, the annotation information can include one or more of: demographic information such as census data on a location housing cost statistics of a location (e.g. from public records to know average home sales price or rental cost); ambient noise measurements collected from devices previously at the location at various times; sentiment or keywords from social network data (e.g. tweets or social network-site posts) originating at the location; names and categories of nearby businesses; keywords and ratings from reviews of nearby businesses; crime statistics; satellite imagery (e.g. to determine if there's a pool); lot line polygons from public records (e.g. to determine size of a residence, such as a house, apartments, or a condo); accelerometer data collected from devices near the location (e.g. to know whether it's foot traffic or vehicle).

In some embodiments, the LIF module 112 can receive geo-location coordinates in a batch mode. In other embodiments, the LIF module 112 can receive the geo-location coordinates in a streaming mode.

The L1A module 114 can be configured to analyze the sessions, clusters, and/or the annotation information generated by the LIF module 112 to determine a profile of a target entity, such as a client 106. The profile can include a set of high level attributes that describes a target entity. Depending on the associated high-level attributes, a profile can be characterized as a behavioral profile, describing behavioral characteristics of a target entity; a demographic profile, describing a demographic grouping or a market segment corresponding to a target entity, such as age bands, social class bands, and gender bands; or a geographic profile, describing locations of a connected series of events or locations visited by a target entity. One or more of the behavioral profile, the demographic profile, and the geographic profile can form a single aggregate profile for a target entity.

In some embodiments, the LIA module 114 can use a machine learning technique to generate a profile. For example, the LIA module 114 can use a random forest technique to determine attributes of profiles from the sessions, clusters, and/or annotation information.

In some embodiments, the LIF module 112 and/or the LIA module 114 can be implemented in software stored in the non-transitory memory device 110, such as a non-transitory computer readable medium. The software stored in the memory device 110 can run on the processor 108 capable of executing computer instructions or computer code.

In some embodiments, the LIF module 112 and/or the LIA module 114 can be implemented in hardware using an ASIC, PLA, DSP, FPGA, or any other integrated circuit. In some embodiments, the LIF module 112 and the LIA module 114 can both be implemented on the same integrated circuit, such as ASIC, PLA, DSP, or FPGA, thereby forming a system on chip.

In some embodiments, the server 102 can receive the location information of a target entity from a service provider 118. The service provider 118 can communicate with one or more clients 106 to receive location data points associated with the clients 106, and provide the received location data points to the server 102. In some embodiments, the service provider 118 can aggregate the location data points over a predetermined period of time, and provide the aggregated location data points in bulk. In other embodiments, the service provider 118 can stream the location data points, or send location data points aggregated over a short period of time, to the server 102. The service provider 118 can include a software service provider, an application provider, a communication service provider, a publisher, or any other types of service providers.

In some embodiments, the server 102 can communicate with clients 106 directly, for example via a software application programming interface (API), to receive location information of the clients 106. The server 102 can subsequently analyze the location information to compute profiles of the clients 106. Then, the server 102 can provide the computed profiles to service providers incrementally or in a bulk mode, or when interesting new attributes are added to the profiles.

The server 102 can include one or more interfaces 116. The one or more interfaces 116 provide a communication mechanism to communicate internal to, and external to, the server 102. For example, the one or more interfaces 116 enable communication with clients 106 and/or the service provider 118 over the communication network 104. The one or more interfaces 116 can also provide an application programming interface (API) to other servers, service providers 118, or computers coupled to the network 104 so that the server 102 can receive location information, such as geo-location coordinates. The one or more interfaces 116 are implemented in hardware to send and receive signals in a variety of mediums, such as optical, copper, and wireless, and in a number of different protocols some of which may be non-transitory.

In some embodiments, the server 102 can operate using an operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The server's software can be divided into a series of tasks that perform specific functions. These tasks communicate with each other as needed to share control and data information throughout the server 102. A task can be a software process that performs a specific function related to system control or session processing. Three types of tasks operate within the server 102 in some embodiments: critical tasks, controller tasks, and manager tasks. The critical tasks control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem includes critical tasks, controller tasks, and manager tasks. Some of the subsystems that run on the server 102 include a system initiation task subsystem, a high availability task subsystem, a shared configuration task subsystem, and a resource management subsystem.

The system initiation task subsystem is responsible for starting a set of initial tasks at system startup and providing individual tasks as needed. The high availability task subsystem works in conjunction with the recovery control task subsystem to maintain the operational state of the server 102 by monitoring the various software and hardware components of the server 102. Recovery control task subsystem is responsible for executing a recovery action for failures that occur in the server 102 and receives recovery actions from the high availability task subsystem. Processing tasks are distributed into multiple instances running in parallel so if an unrecoverable software fault occurs, the entire processing capabilities for that task are not lost.

Shared configuration task subsystem can provide the server 102 with an ability to set, retrieve, and receive notification of server configuration parameter changes and is responsible for storing configuration data for the applications running within the server 102. A resource management subsystem is responsible for assigning resources (e.g., processor and memory capabilities) to tasks and for monitoring the task's use of the resources.

In some embodiments, the server 102 can reside in a data center and form a node in a cloud computing infrastructure. The server 102 can also provide services on demand. A module hosting a client is capable of migrating from one server to another server seamlessly, without causing program faults or system breakdown. The server 102 on the cloud can be managed using a management system.

Although FIG. 1 represents the server 102 as a single server, the server 102 can include more than one server.

A client 106, which may be a target entity of the location information analytics platform, can include a desktop computer, a mobile computer, a tablet computer, a cellular device, or any other computing devices having a processor and memory. The server 102 and the one or more client devices 106 can communicate via the communication network 104.

In some embodiments, the client 106 can include user equipment of a cellular network. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to location data to the mobile device, in which case the screen can be used instead of the full keyboard. The user equipment can also keep global positioning coordinates, profile information, or other location information.

The client 106 also includes any platforms capable of computations. Non-limiting examples can include computers, netbooks, laptops, servers, and any equipment with computation capabilities. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client 106 can also provide a variety of user interfaces such as a keyboard, a touch screen, a trackball, a touch pad, and/or a mouse. The client 106 may also include speakers and a display device in some embodiments.

The communication network 104 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 represents the network 104 as a single network, the network 104 can include multiple interconnected networks listed above.

Figure 2:
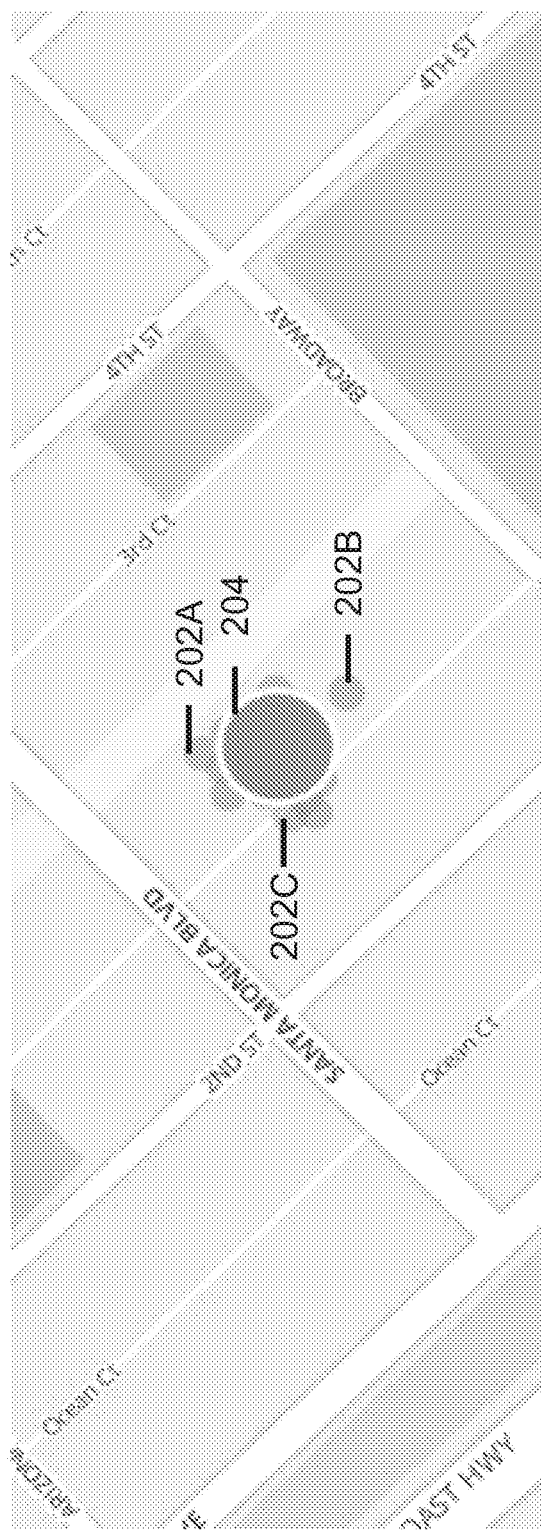
FIG. 2 illustrates an area of activity (AoA) in accordance with some embodiments.

The server 102 can be configured to identify and classify specific areas of activity (AoA)—locations that a target entity visited in more than one occasion—based on location information associated with the target entity. The server 102 subsequently analyzes the AoAs collectively to determine patterns of behavior and reference, and turn these patterns into geographic, demographic, and/or behavioral profiles. FIG. 2 illustrates an area of activity in accordance with some embodiments. In FIG. 2, irregular and intermittent activities 202A-202C of a single target entity are normalized into an area of activity (AoA) 204.

Figure 3:
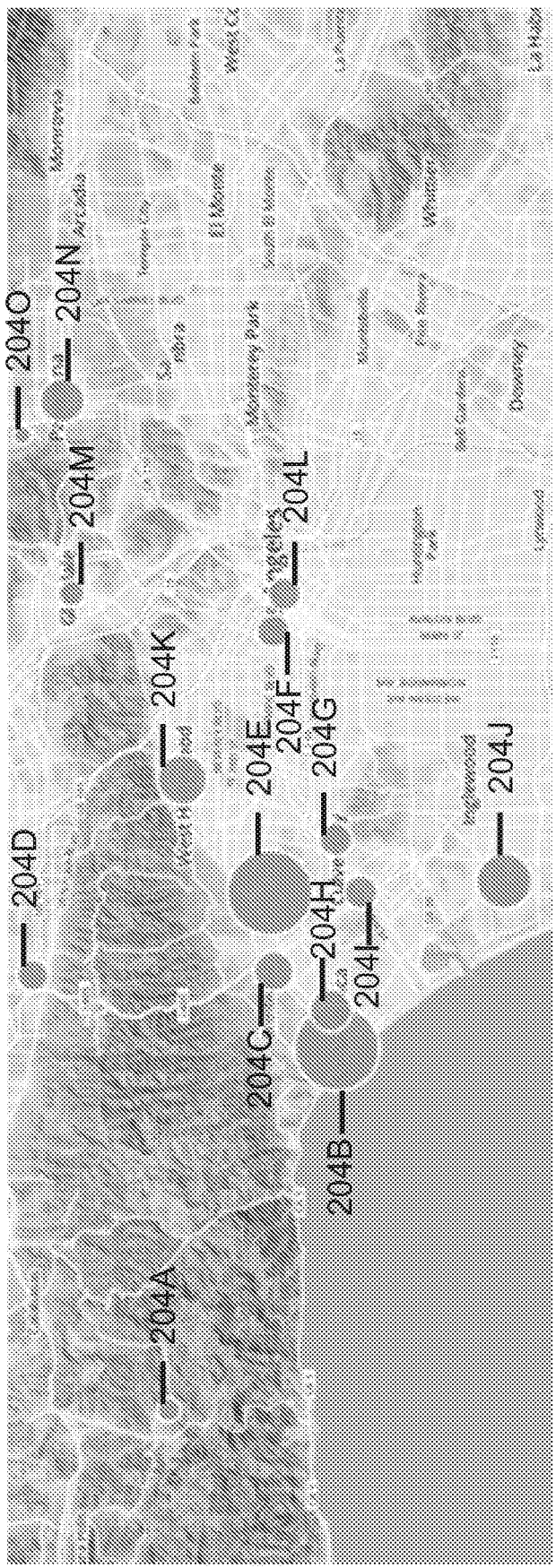
FIG. 3 illustrates a set of area of activities (AoAs) in accordance with some embodiments.
Figure 4:
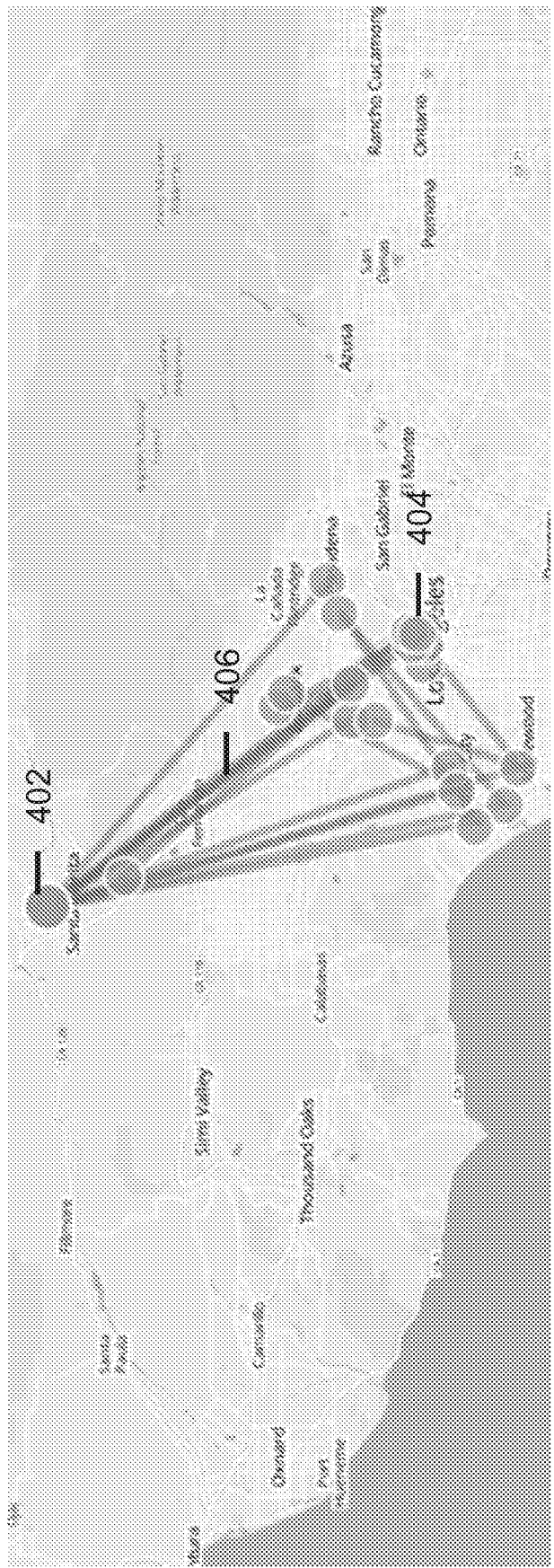
FIG. 4 illustrates patterns of movements between AoAs in accordance with some embodiments.

The AoAs of a single target entity can be aggregated into a set of AoAs. FIG. 3 illustrates a set of AoAs in accordance with some embodiments. The size of the AoAs 204A-204O can indicate the relative frequency of activities within that AoA over a predetermined period of time. Once the set of AoAs is determined, the server 102 can analyze general patterns of movements between the AoAs 204 and rank them by importance. FIG. 4 illustrates patterns of movements between AoAs in accordance with some embodiments. For example, FIG. 4 shows, using a line 406, that the mobile device frequently travels between Santa Monica 402 and Los Angeles 404. The frequency of the trip between two AoAs can be illustrated using a thickness of the line 406 bridging the two AoAs or by using a color-coding scheme. This analysis can enable the server 102 to determine the zip code associated with the home residence, typical commuting start and end times, and diurnal behavior patterns to inform the predictive model.

Figures 5A, 5B, 5C:
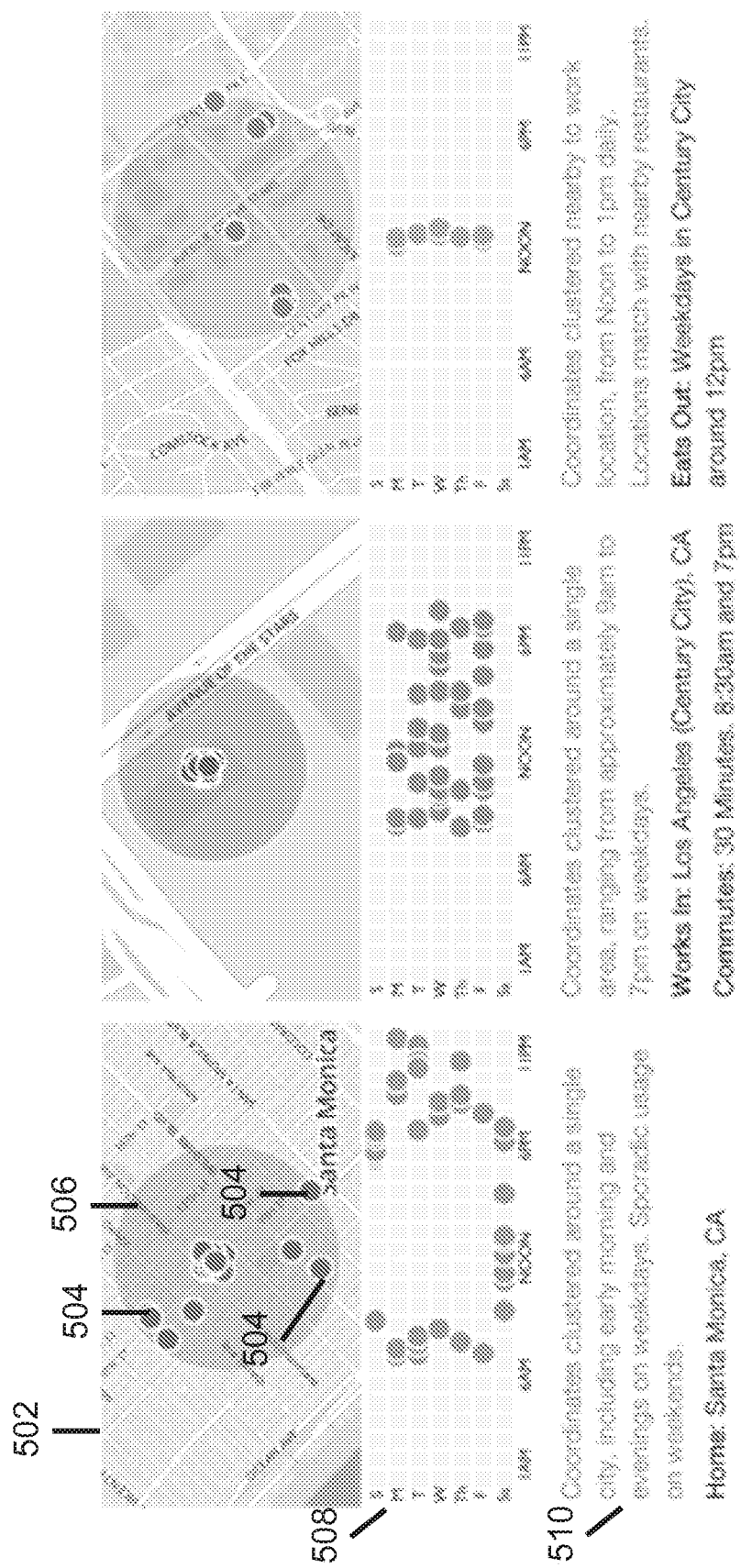
FIGS. 5A-5C illustrate a profile of user activities around AoAs in accordance with some embodiments.

In some embodiments, user activities around an AoA can be summarized in a profile. FIGS. 5A-5C illustrate a profile of user activities around AoAs in accordance with some embodiments. FIG. 5A illustrates a profile of user activities around Santa Monica, Calif., which the server 102 identifies as "home". The profile can include a map 502 indicating one or more location data points 504 contributing to the AoA 506. The profile can also include a time-table 508, indicating time instances at which location data points 504 contributing to the AoA 506 appeared in the vicinity of the AoA 506. The profile can further include a summary 510 of the location data points 504 contributing to the AoA 506. FIG. 5B similarly illustrate a profile of user activities around Los Angeles (Los Angeles), identified as a work place. FIG. 5C illustrates user activities associated with predetermined criteria. In this case, the predetermined criteria are "user activities around Los Angeles (Los Angeles) from noon to 1 PM at locations matching nearby restaurants." Such predetermined criteria allow the server 102 to infer user's activities at predetermined locations.

In addition to the locations, rank, and business categories of these AoAs and their relative importance, the server 102 can provide a ranked breakdown of all cities, regions, countries, metro areas, and DMAs in a user profile. More particularly, the server 102 can be configured to determine whether a particular location is in a polygon (or a region of interest) corresponding to a particular city, region, country, metro area, and/or a DMA, and provide the determined information as a part of a user profile. For example, the server 102 is configured to use location information, such as a latitude/longitude pair, to identify for all of the "areas" (e.g., polygons) that encompass the location associated with the location information. This allows the server 102 to receive attributes associated with each of those areas, including, for example, the name of the area, the name of the regions that encompass the area, and any metadata associated with the area or the region (e.g. average income, demographics). This information allows content providers to use location-based contextual information effectively to customize content events when a geo signal is absent.

Figure 6:
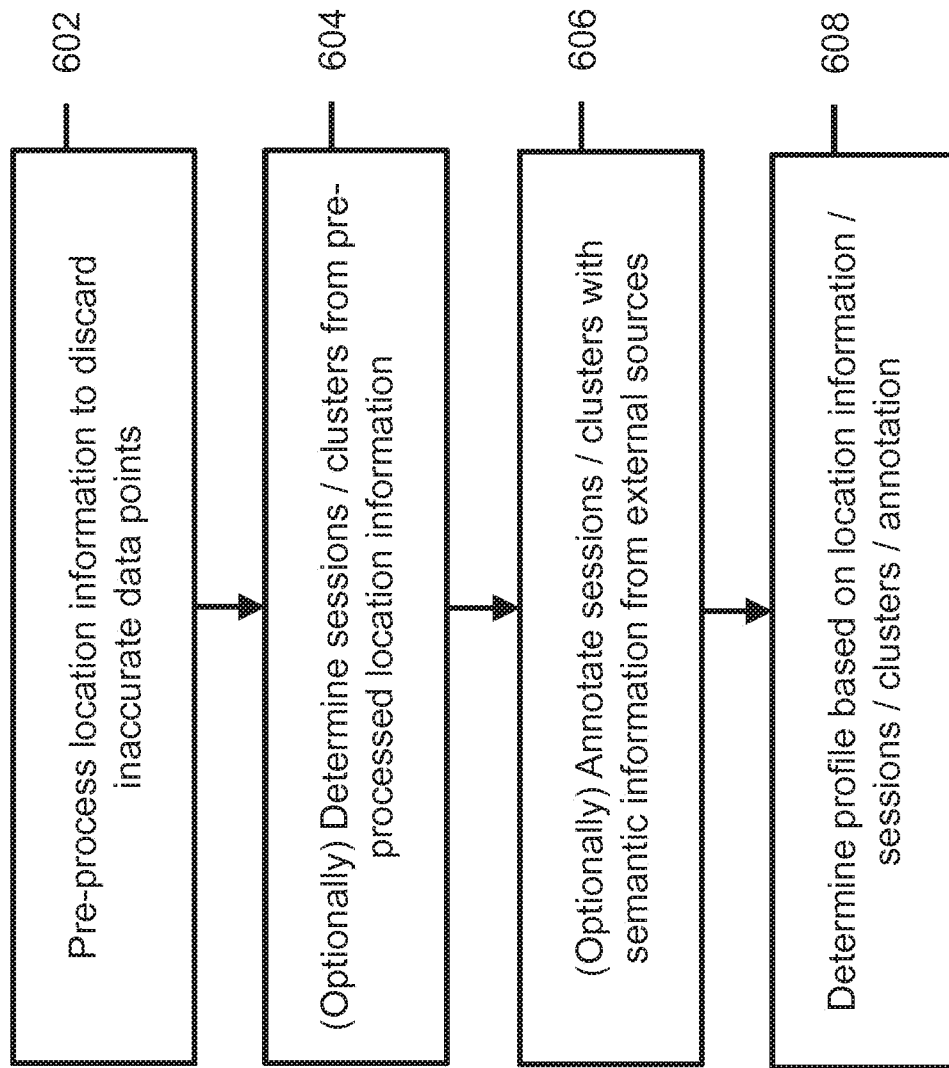
FIG. 6 illustrates a process for generating a profile of a target entity in accordance with some embodiments.

FIG. 6 illustrates a process for generating a profile of a target entity in accordance with some embodiments. In step 1, the LIF module 112 can receive, from service providers or mobile devices 106, location information associated with the one or more mobile devices 106. In some embodiments, the location information can include one or more of (1) geospatial coordinates, (2) a timestamp, and/or (3) an identifier (ID) of a target entity. As an example, the single location data point can be [42.3583° N, 71.06030 W (Boston), 10:30 AM Jan. 10, 2012, John Doe's mobile phone], which indicates that John Doe's mobile phone was located in Boston at 10:30 AM on Jan. 10, 2012. The geospatial coordinates in the location data point can take the form of a coordinate pair, for example, [longitude, latitude], or other forms as would be used by a target entity for indicating the location. Multiple location data points of this nature are used to create a profile. In some embodiments, the identifier of the location information can be pre-hashed by the service provider or the target entity so that the actual user of the target entity remains anonymous to the server 102.

In some embodiments, the LIF module 112 can receive the location information in bulk (e.g., an aggregated form). For example, the service provider or the target entity can aggregate location information over time and provide the aggregated location information in bulk (e.g., substantially at the same time) to the LIF module 112. In other embodiments, the LIF module 112 can receive the location information as it becomes available (e.g., in a streaming mode). For example, the LIF module 112 can receive, from the service provider or the one or more the target entities over a representational state transfer (REST) interface, the location information as it becomes available. In some embodiments, the LIF module 112 can receive the location information both in bulk and when it becomes available. For example, the L1F module 112 can receive, in bulk, the location information of the first mobile device and the LIF module 112 can receive the location information of the second mobile device in a streaming mode (e.g., as it becomes available).

Once the LIF module 112 receives the location information, the LIF module 112 can preprocess the location information. In particular, the LIF module 112 can be configured to quantize the spatial dimension of the received location information. For example, the LIF module 112 can be configured to quantize the geospatial coordinate (e.g., latitude/longitude pair) into a predetermined precision of coordinates. As another example, the LIF module 112 can be configured to quantize the geospatial coordinate into a geohash representation.

In some embodiments, because the location information can be generated by a variety of sources, for example, an on-device GPS system, a web browser, geotagged images, and business check-ins, some of the received location data points may not be sufficiently accurate. If the geospatial coordinate in a location data point is not sufficiently accurate, the LIF module 112 can discard the location data point and the discarded location data point is not subject to further processing. This cleansing processes, e.g., processes that discover and remove location data points from further processing, can be performed across multiple user identifiers, and can be done across multiple datasets for more accurate results.

In some cases, some location data points are known to be bad or inaccurate. For example, if a data point corresponds to a center of a nuclear plant, or to desert with no access path, then there is a high chance that the data point is bad or inaccurate. Therefore, in some embodiments, the LIF module 112 can maintain a blacklist of data point characteristics that should be discarded. For example, the LIF module 112 can identify, as black-listed, location data points that align to the coordinates of known geographical entities (such as postcodes and city centroids), or known cell-tower locations because they may be too coarse for the application of interest.

In some embodiments, the LIF module 112 can discard the location data point if the confidence score, representing the accuracy of a location data point is below a predetermined threshold. The confidence score of a location data point can be determined based on a variety of information. In some cases, if a particular location is over-represented at a particular time instance (e.g., many IDs are associated with the same geographical coordinate at the same time), then the confidence score of the location data point, indicating that a target entity is located at that particular location at that particular time instance, can be low.

For example, if a town has 25,000 residents, and if the aggregate location information indicates that 22,000 target entities are located at a particular location at the same time, a location data point indicating that a target entity is located at that particular location is probably inaccurate. Therefore, such a location data point can be associated with a low confidence score. As another example, if the number of location data points associated with a particular location is more than 0.1% of the entire set of location data points, then it's highly likely that location data points associated with the particular location is inaccurate. Therefore, such a location data point can be associated with a low confidence score. In other words, if the number of location data points associated with a particular location is greater than a predetermined threshold, any location data point associated with the particular location can be deemed inaccurate and be associated with a low confidence score.

In some embodiments, the predetermined threshold for discarding the location data point can be adapted to the characteristics of the location information data set. For example, the predetermined threshold for a data set associated with a small town can be different from the predetermined threshold for a data set associated with Los Angeles, Calif.

In some embodiments, the LIF module 112 can apply a variety of filters to further discard unwanted data points. For example, target entities that do not have a sufficient volume of data can be eliminated from further processing.

In some embodiments, the LIF module 112 can reduce the noise in the location data points. Because a target entity's movement is expected to be smooth, any rapid movements centered around a particular location can be considered as noise, which may stem from the non-ideal characteristics of the location sensing device, such as a GPS jitter. Therefore, the LIF module 112 can model the temporal noise as a Gaussian distribution and temporally average the location data points to remove the temporal jitter from the location data points. For instance, if a target entity goes to the same Starbucks every day at 7 PM, and if location information of the target entity at 7 PM indicates that the user is close to the same Starbucks, then the LIF module 112 can temporally average the GPS coordinate so that the averaged GPS coordinate is more closely aligned with the same Starbucks. In some embodiments, the LIF module 112 can average location data points that are within a predetermined time window from the location data point of interest. For example, the LIF module 112 can average location data points that are within a 5-second window from the location data point of interest. In other embodiments, the LIF module 112 can average location data points that belong to the same time instance in previous days or months. For example, in the above Starbucks example, the LIF module 112 can average location data points associated with 7 PM for the last 5 days to remove noise of today's location data point associated with 7 PM.

In step 604, the LIF module 112 can optionally determine sessions and clusters from the pre-processed location information. A session is an abstraction used to remove redundancy from location data points. This abstraction can insulate the LIF module 112 from rapid resubmissions of similar or identical location data points from the same target entity. For example, if the LIF module 1 12 receives a first location data point and a second location data point from the same target entity within a second of each other and from the same location, the LIF module 112 can fold those into a single session because the second data point does not provide any interesting information. Another way to view the session is that the session marks an event. The LIF module 112 is essentially grouping a stream of location data points into high-entropy events.

Based on this view of a session, a session can include a set of location data points from the same target entity (e.g., the same identifier) bounded in space and/or time. Therefore, the LIF module 112 can be configured to group any location data points that are bounded in space and/or time, and represent all grouped location data points using the temporally earliest location data point in that group. For example, a session can include a group of location data points that are (1) within 5 miles from the center of Los Angeles and/or that are (2) within a span of 10 minutes. Therefore, the LIF module 112 can be configured to group all data points that are (1) within 5 miles from the center of Los Angeles and/or (2) that are within a span of 10 minutes, and represent all these data points using the earliest location data point within that group of data points.

In some embodiments, the session can be represented using a plurality of parameters. One of the plurality of parameters can represent a period of time corresponding to the session; one of the plurality of parameters can represent a geographical bound corresponding to the session. Therefore, as an example, a single session can include all location data points collected while a particular user's mobile phone was at a particular location (e.g., between 100-120 Main Street) during a particular time interval (e.g., from 10:00 AM to 10:15 AM on Jun. 12, 2012). The L1F module 112 can, therefore, use the plurality of parameters to group location data points into one or more sessions. In some embodiments, the bounds for the space and/or time can be provided by an operator of the server 102. In other embodiments, the LIF module 112 can automatically determine the bounds for the space and/or time using a clustering technique, such as K-means clustering.

In some embodiments, a session can include an event. A rapid change in the entropy of a sequence of geolocation coordinates can be indicative of a transition between two distinct events. Therefore, the LIF module 112 can be configured to determine a rapid change in the entropy of a sequence of geolocation coordinates.

In some embodiments, the LIF module 112 can use geographical polygons to identify sessions from a sequence of geolocation coordinates. For example, a geographical polygon can be associated with a particular building in Los Angeles. If a user is within the geographical polygon, then all temporally-bounded location data points associated with the geographical polygon can be deemed to belong to the same session. The LIF module 112 can use a hierarchical mechanism to quickly determine whether a location data point is associated with a particular geographical polygon. For example, the LIF module 112 can use the polygon matching mechanism, as disclosed in "APPARATUS, SYSTEMS, AND METHODS FOR PROVIDING LOCATION INFORMATION," supra.

During session processing, a location data point may be associated with only one session. Conversely, one session might be associated with any number of location data points provided they satisfy the space and/or time session parameters. For example, a session can include a single location data point.

After session processing, location data points within a session can represent events or places visited by a particular ID.

In some embodiments, the LIF module 112 may not identify any sessions from the location data points. For example, the LIF module 112 can skip the session identification step. This scenario is identical to a scenario in which a session includes a single location data point. Therefore, the forthcoming discussion of using sessions to determine clusters and/or attributes can also be applicable to cases in which the LIF module 112 does not identify any sessions.

Once the LIF module 112 identifies one or more sessions from the time-series of location data points, the LIF module 112 can determine one or more clusters based on the identified sessions. Clusters can include groupings of sessions which represent repeated behaviors over time. Conceptually, any session with a new geo-spatial location can correspond to a new cluster, and later sessions can be added to one of existing clusters provided that these later sessions meet certain geographic criteria. Therefore, the LIF module 112 is configured to group one or more sessions into a single clusters by identifying sessions that are geographically close to a center of a cluster. As an example, the first time John Doe's mobile phone moves to a new location (e.g., 200 Main Street), location data associated with that new location can be grouped into a new session. If that same mobile phone later returns to that location (200 Main Street), data associated with that second visit can be grouped into another session. Then, both sessions can be grouped into a single cluster because the sessions are associated with the same location.

Figure 7:
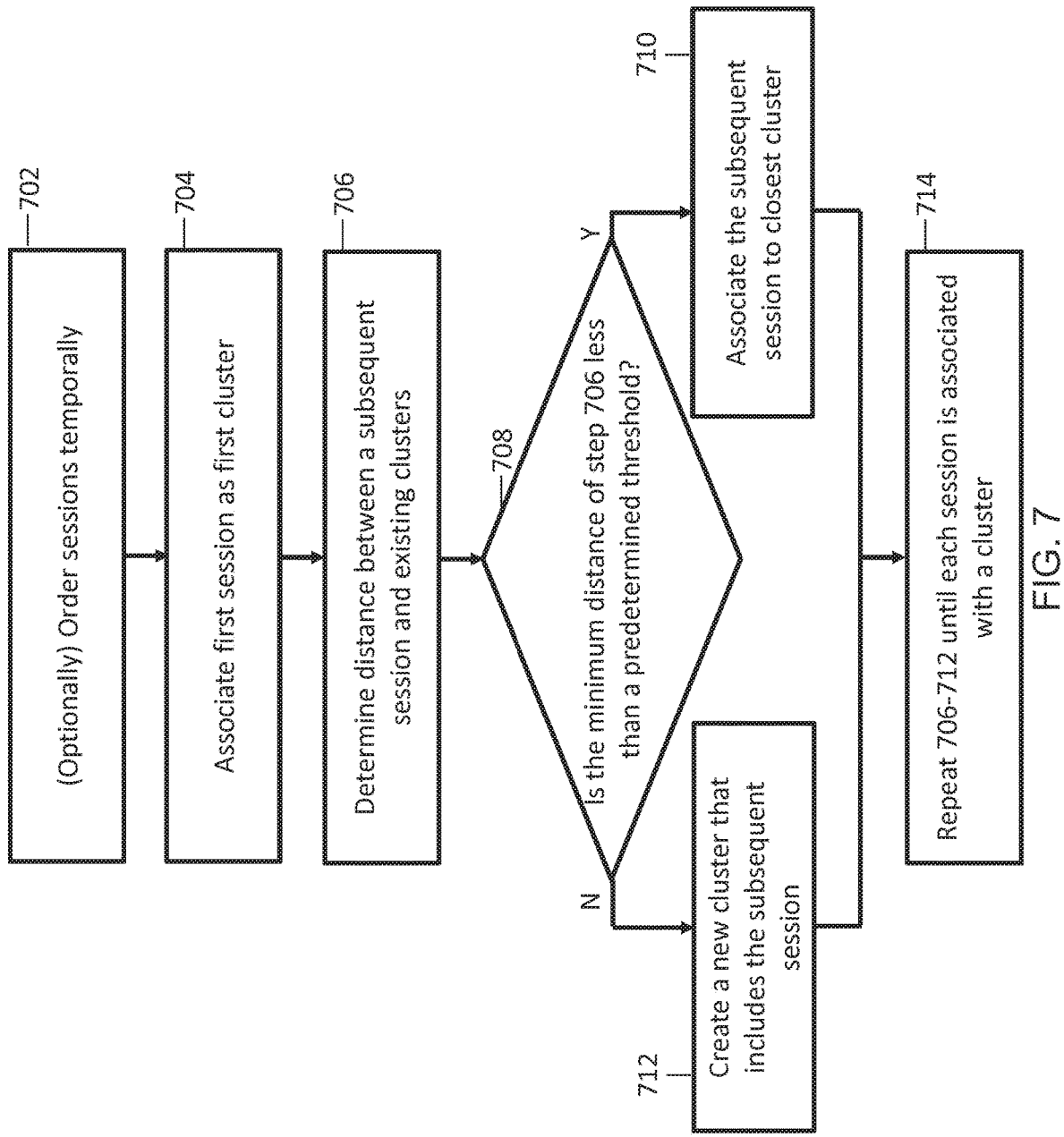
FIG. 7 illustrates a process for clustering two or more sessions into a cluster in accordance with some embodiments.

FIG. 7 illustrates a process for clustering two or more sessions into a cluster in accordance with some embodiments. In step 702, the LIF module 112 can optionally sort the sessions in the temporal order. For example, the LIF module 112 can order the sessions so that a session represented by the earlier location data point appears before a session represented by the later location data point. While this ordering step is not necessary, this allows the LIF module 112 to order the clusters temporally as well.

In step 704, the LIF module 112 can designate the first session as a first cluster. In step 706, the LIF module 112 can analyze a subsequent session, which is herein referred to as a candidate session. In particular, the LIF module 112 can determine the distance between the center of the candidate session and the center of the representative session of the existing cluster. In step 708, the LIF module 112 can determine whether the minimum of the distances computed in step 706 is less than a predetermined threshold. If so, in step 710, the LIF module 112 can associate the candidate session with the cluster corresponding to the minimum distance. If not, in step 712, the LIF module 112 can create a new cluster for the candidate session and assign the candidate session as the representative session of the new cluster.

In step 714, the LIF module 112 can repeat steps 706-712 until each session is associated with a cluster.

In some embodiments, in step 706, the LIF module 112 can be configured to compute a distance between the center of the candidate session and the center of all sessions in the existing cluster, instead of the distance between the center of the candidate session and the center of the representative session of the existing cluster. The center of all sessions in the existing cluster can include a center of the centroid formed by the sessions in the existing cluster. When a session is added to a cluster, the LIF module 112 can recomputed the center of all sessions in the cluster. In some embodiments, the clusters can be used as AoAs, illustrated in FIGS. 2-5.

FIG. 8 illustrates an example of how location data points are grouped into sessions and sessions are grouped into clusters in accordance with some embodiments. It will be appreciated that FIG. 8 presents a simplified case. In FIG. 8, each session corresponds to a location and time. In practice, location data may not be available at uniform time intervals because users typically move from one location to another more randomly and are not sending data at a constant rate. Sessions may include many individual data points as Session 1 shows. Also, in FIG. 8, the location information is given in the form of an address, e.g., 200 Main Street. However, the location information is typically in the form of a (longitude, latitude) geographical coordinate. Session and cluster processing is normally based on such geographical coordinates. Addresses (e.g., 200 Main Street) or other higher level location descriptors can be added during the "annotation" processing step (step 606), which is discussed below.

Clusters are generally weighted based on the number of sessions that they contain. Thus, for a particular ID, there is normally a main cluster which represents the most visited geographic location, followed by any number of secondary clusters. In FIG. 8, cluster 1 is the main cluster, and has the highest weight. Clusters 2 and 3 are the secondary clusters.

Clusters can be constructed to compensate for small local movement (e.g., noise associated with location data points) while also accurately pinpointing the specific location with which this movement is associated. One way to achieve this is to divide geographic locations into overlapping tiles, e.g., of 50×50 meter squares. FIGS. 9A-9G illustrate such a division for a small geographic area in accordance with some embodiments. Each of the tiles shown in FIGS. 9A-9G is a 50×50 meter square. The illustrated tiles are offset from one another by half the length of a tile, i.e., by 25 meters. With the overlapping arrangement illustrated in FIGS. 9A-9G, any point within the defined area will fall within four tiles. For example, the point with coordinates (10, 10) falls within the tiles illustrated in FIGS. 9A, 9E, 9F, and 9G. As another example, the point with coordinates (49, 49) falls within the tiles illustrated in FIGS. 9A, 9B, 9C, and 9D. It will be appreciated that the tiles can be extended beyond the range illustrated in FIG. 9, maintaining the overlapping pattern, so as to cover a larger geographic area.

In some embodiments, the LIF module 112 can fine-tune the determined clusters. In certain scenarios, a target entity may visit two near-by locations for two different reasons. For example, on the way to work, a target entity regularly visits 300 Greenwich Street, NY for a cup of coffee, and on the way back home, the target entity regularly visits 301 Greenwich Street, NY for a food pickup. If the location data is inaccurate, then two entities would likely be merged into a single cluster, and there would be no way to separate the merged entities.

The LIF module 112 can address this issue by clustering sessions based on a variety of characteristics associated with sessions, not simply based on location coordinates. For example, the LIF module 112 can create clusters based on the path or a temporal progression of coordinates or a time of visit. More particularly, in steps 706-712, the LIF module 112 can identify clusters by considering not only the physical proximity, but also other types of relevant information, for example, time information. This feature is useful in cases where two nearby locations have different semantic significance. For example, this feature is useful when two floors at the same building (hence the latitude/longitude pair) are operated by two different companies.

To this end, in step 706, the LIF module 112 can quantize the time as well as the geographical coordinate of a session (or, if the LIF module 112 does not identify sessions, the geographical coordinate of a location data point). In particular, the LIF module 112 can be configured to identify common temporal patterns. For example, that a session or a location data point is associated with "end of a workday" or "Saturday morning." Then, the LIF module 112 can be configured to add the session or the location data point to either the last-visited cluster or the last N visited clusters.

In some embodiments, the LIF module 112 can be configured to cluster events using a maximum likelihood model. The LIF module 112 can be configured to characterize clusters based on an information gain along any of information axes (for example, time, previous location). Then, when the LIF module 112 receives a new event to be added to one of the clusters, the LIF module 112 determines the likelihood that the new event is associated with the clusters, and selects the cluster with the maximum likelihood.

More particularly, to characterize a cluster based on an information gain, the LIF module 112 can be configured to receive all data points currently within a cluster and quantize field values (e.g., attributes) associated with the data points. Then, the LIF module 112 can construct histograms of these quantized fields and interpret them as statistical distributions. Subsequently, when the LIF module 112 receives a new event, the LIF module 112 can determine a cluster to which the new event shall be added by quantizing the fields in the new event, determining probabilities (e.g., Percent-|cluster)) that the new event belongs to the clusters based on the histograms constructed previously, and selecting the cluster with which the probability is the highest. In some embodiments, to avoid cases where the probability P(event-|cluster) is zero, the LIF module 112 can add a noise floor to the histogram constructed for each cluster.

In some embodiments, the LIF module 112 can be configured to merge two or more clusters using a maximum-likelihood model. In some cases, the LIF module 112 can be configured to merge clusters based on a joint entropy between clusters, which can be measured based on Kullback-Liebler (K.L) divergence. In other cases, the LIF module 112 can merge clusters using any hierarchical clustering technique.

In step 606, the LIF module 112 can optionally annotate sessions and/or clusters using information from external data sources. In this step, sessions and clusters are enriched with outside data sources, a process known as annotation. For example, information that describes the surrounding business categories or demographics associated with a location are appended to the corresponding cluster or session at that location. Together, these annotations create a rich dataset that are used to enrich the profile of a target entity, and act as the foundation for further annotations.

In some embodiments, the LIF module 112 can receive annotation data from an external database. In other embodiments, the LIF module 112 can analyze the text on webpages to generate the annotation data.

In some embodiments, some internal optimizations can be made to reduce the number of queries the LIF module 112 makes to external data sources. These internal optimizations can include merging nearby sessions and reusing old queries by interpolating results.

In step 608, the LIF module 112 can provide the sessions, clusters and/or annotation data associated with a target entity to the LIA module 114 so that the LIA module 114 can determine one or more profiles for the target entity based on the sessions, clusters and/or annotation data.

In some embodiments, the LIF module 112 may not identify any clusters from the sessions and/or location data points. For example, the LIF module 112 can skip the cluster identification step. This scenario is identical to a scenario in which a cluster includes a single session or a single location data point. Therefore, the forthcoming discussion of using clusters to determine attributes can also be applicable to cases in which the LIF module 112 docs not identify any clusters.

The LIA module 114 is configured to analyze the location data points, sessions, clusters and/or annotation data over a period of time to build a general description of the target entity and provide the general description in the form of a profile. The profile can be a JavaScript Object Notation (JSON) hash. The profile can include (1) one or more attribute values describing the target entity and (2) one or more confidence scores associated with the one or more attribute values. In some embodiments, the attribute values can include (1) areas of activity, categorized by business type and summarized by country, metro area, and DMA, (2) demographic information, including household income where available, and/or (3) behavioral traits and classifications. The profile can be specifically designed to enhance the interaction between a service provider and individual users. The profile can help service providers to serve correct local news and more relevant information, to customize information content by location, and to ensure that only the most contextually relevant information is served to users at the right time.

In some embodiments, the geographic attribute of a profile can provide an overview of locations that the target entity is most active. The locations can be represented at different physical scales, for example, at a hyper-local, a regional, and/or a national scale. The profile can also include specific, hyper-local places associated with the user activity, including, for example, centroids of the hyper-local places, associated postcodes, the type of hyper-local places, and/or the commercial density of the area. FIG. 10 illustrates the geographic attribute of a profile in accordance with some embodiments. The geographic attribute of a profile includes an "Area of Activity (AoA)" entry, which includes an identifier of the AoA, the center of the AoA, the commercial density in the AoA (which measures a portion of the AoA corresponding to a commercial area), a postcode associated with the AoA, the ranks of the AoA (e.g., frequency or importance associated with the AoA), and the type of the hyper-local place (e.g., away, indicating that the AoA is not a primary area of activity.)

In some embodiments, the profile can also include an attribute indicating a home location for the target entity. The LIA module 114 can be configured to determine the home location (also known as a home attribute of the profile) by analyzing the movement patterns of the target entity between AoAs, whether a particular location (e.g., the AOA corresponding to the particular location) is known to be (or is likely to be) a residence, including, for example, a house, an apartment and a condo, a commercial/residential density around the location, a frequency of the particular location (e.g., the AOA corresponding to the particular location) relative to other AoAs, and/or the timestamps of location data points associated with the movement patterns. In some embodiments, the home location can be represented as a postal code. In other embodiments, the home location can be represented as a geospatial coordinate, such as a GPS coordinate or a latitude/longitude coordinate pair.

FIG. 11 illustrates a home location attribute of a profile of a target entity in accordance with some embodiments. The home location attribute can indicate the center of the centroid (or an AoA) corresponding to the home location, the commercial density in the AoA, and a postcode. In some embodiments, the postcode in the home location attribute can be associated with the home location itself. In other embodiments, the postcode in the home location attribute can be associated with the AoA within which the home is located. Such embodiments can improve the privacy of users. In some embodiments, the commercial density can be represented as a percentage. For example, the percentage of the residential area within the centroid of the home location can be 81.1%, as indicated in FIG. 11, and the percentage of the businesses within the centroid of the home location can be 4.6%. The commercial density can be useful in determining the urban/suburban/rural context of a user's residence.

In some embodiments, the LIA module 114 can be configured to provide a list of location entities in which the user has been active. The location entities can include countries, regions, and/or localities (towns). The LIA module 114 can provide the list of such location entities in the order of relative significance. In some cases, the LIA module 114 can determine the significance associated with the location entities based on the amount of time spent at a particular location entity. For example, when a user stays at home 90% of the time, home may be an important location entity. In some cases, the LIA module 114 can determine the significance associated with the location entities based on how informative the annotations associated with the particular location entity arc. Also, in some cases, the LIA module 114 can determine the significance associated with the location entities based on how important the behavior associated with the particular location entity is. For example, when a user stays home 90% of the time, but the user also spends 10 minutes at a school in the morning and afternoon, this location entity can be important because it may tell us that the user is likely a parent.

FIG. 12 illustrates a list of location entities provided in a profile of a target entity in accordance with some embodiments. Each location entity can be associated with a particular geographical scale. For example, FIG. 12 shows three location entities, the first entity associated with "countries", the second entity associated with "regions", and the third entity associated with "localities." Each location entity can be associated with a unique identifier (referred to as "factual id" in FIG. 12), and can be associated with a location data point, such as a latitude/longitude coordinate pair. Also, the one or more of the entries in the location entity can be associated with a confidence score.

In some embodiments, when the target entity is associated with a location within the United States, the profile can also include additional geographic summaries. The additional geographic summaries can include Nielsen's Direct Marketing Area (DMA) and/or Metro (formerly MSA as defined by the United States census) in which the user is active. FIGS. 13A-13B illustrate the DMA attribute and the Metro attribute in a profile of a target entity in accordance with some embodiments.

In some embodiments, the L1A module 114 can determine demographic attributes for the target entity's profile. In particular, the LIA module 114 can determine the demographic attributes based on the user's home location, aggregated at the block group level by the US census data, and/or based on the user's activities. FIG. 14 illustrates demographic attributes of a profile of a target entity in accordance with some embodiments. The demographic attributes can include an income level, a gender, age, a household type, and a race. Also, one or more of the demographic attributes can be associated with a confidence score.

In some embodiments, the LIA module 114 can determine behavioral attributes for the target entity's profile. The behavioral attributes can categorize target entities into one or more categories, which can be used in online advertising. Target devices are categorized only when the confidence score is sufficiently high to qualify their presence in these categories. FIG. 15 illustrates behavioral attributes of a profile of a target entity in accordance with some embodiments. Behavioral attributes can include one or more predetermined categories and a confidence score indicating the likelihood that the target entity is associated with the one or more predetermine categories. The predetermined categories can include: whether the target entity is owned by a business traveler, whether the target entity is owned by a leisure traveler, whether the target entity is owned by a frequent traveler, whether the target entity is owned by a health care provider, whether the target entity is owned by a college student, whether the target entity is owned by a person interested in buying a car, whether the target entity is owned by a moviegoer, whether the target entity is owned by a vacationer, whether the target entity is owned by a live sports fan, and/or whether the target entity is owned by an affluent customer. Standard categories can be applied across the dataset to find groups of IDs that share tendencies or patterns.

In some embodiments, the LIA module 114 can determine the likelihood that a target entity is associated with a particular category, also referred to as a category confidence score, based on sessions, clusters, and/or annotation data associated with the target entity. For example, annotated clusters may indicate that an ID (a target entity) is biased to operate in more expensive demographic regions, and annotated sessions may indicate that an ID has traveled from one location to another.

In some embodiments, the attributes in the profile can be updated regularly so that the profile does not become stale (or out-of-date). For example, the LI A module 114 can be configured to recompute attributes of a profile periodically. Also, the LI A module 114 can be configured to reduce a confidence score value for an attribute as the attribute ages (e.g., as a function of the time instance at which the attribute was generated or computed).

In some embodiments, the LIA module 114 can use a cross-validation mechanism to determine whether a target entity is associated with a particular attribute or category. At a high level, the LIA module 114 is configured to extract features that represent what the target entity is doing at any given moment. These features are generated from nearby places (if there are any), time-localized events (such as concerts), and landmarks. For example, when a target entity is going to the LA Dodgers stadium, and if, at that time instance, the Dodgers stadium is hosting a rock concert, then the target entity can be preferentially correlated with rock music. As another example, the LIA module 114 can determine the home location by determining the location to which a target entity returns or stays the most at night time, such as after 8 PM.

To this end, the LIA module 114 can, for example, determine the business category, each word in the business name, and high-level category information about events as individual features. Subsequently, the LIA module 114 weighs these features, for example, equally, and use the norm (e.g., an LI-norm) of the resulting vector to perform the cross-validation.

One of the challenges in categorizing the behavior of a target entity is making sure that the LIA module 114 does not over-fit the model. For example, suppose the LIA module 114 finds that a target entity is next to Starbucks on Friday, July 17, at 15:38 pm only. While the physical location of the target entity corresponding to the target entity at that time instance is a remarkably strong signal, spending effort narrowing down the time slice of that observation isn't particularly meaningful. As a result, the LIA module 114 can consider both the amount of effort it takes to describe the observation and the strength of the observation results when the LIA module 114 draws conclusions about a target entity. So, for example, if the LIA module 114 observes that the target entity is next to a Starbucks at 4 pm every Friday for four Fridays in a row, that is a more valuable insight.

In some embodiments, the LIA module 114 is configured to determine behavioral categories of target entities based on a number of times a particular space-time location data point (or a cluster) appears in the time-series of location data points. To this end, the L1A module 114 is configured to (1) project time component of the location data point or the cluster into a cyclic space (e.g., a 24-hour time span, ignoring the date), (2) determine a number of times a particular [space, projected-time] representation of the location data point or the cluster appears in the time-series of location data points, and (3) determine the K-highest number of the [space, projected-time] in the time-series of location data points. More particularly, the LIA module 114 is configured to (1) represent each of the location data point into a pair of [space, projected-time], (2) construct a frequency table of such pairs and, optionally, sort the entries in the frequency table by a descending frequency, and (3) identify pairs from this frequency table whose frequency is greater than a predetermined threshold, such as two.

Other examples of useful properties to note as a result of categorization processing are:

A particular person is a habitual Starbucks customer. Although this person travels a lot throughout the country, regardless of his/her current location, he/she frequently visits a Starbucks between 8:30-9:00 am.

A particular person consistently shops at high end, expensive stores, and never visits low end, inexpensive stores.

A particular person likes hamburgers and is likely to visit any restaurant convenient to his location that serves hamburgers.

A particular person is a fan of the New York Yankees; this person attends Yankee games, both home and away, and also visits stores that sell sports memorabilia.

Other types of categorization are possible, and will in general be dependent on the quality of the location data and the types of annotations that have been annotated to the location information.

In some cases, the LIA module 114 can perform the profile computation in bulk. For example, a service provider may have months or years of geospatial information for many users and devices, and these can be processed by the LIA module 114 in bulk to provide an analysis for the time span covered. In other cases, the LIA module 114 can perform the profile computation as new location data points become available. For example, a service provider may not have detailed logs of location data points over a long period of time, but may instead have access to an ephemeral stream of location data points in real-time or a rolling log of the previous day's location data points. In these cases, the service provider can utilize the LIF module 112 and the LIA module 114 by intermittently posting new location data to the LIF module 112 as it becomes available.

In some embodiments, the location data points can be processed in a batch or in a real-time mode. In a real-time mode, the LIA module 114 can collate the new information with past information to build a new profile. This collation can happen by any number of means, for example, key/value lookup or table joining. In some cases, the LIA module 114 can perform a preliminary processing of new information to determine a priority of profile updates. For example, when the LIA module 114 determines that a mobile device is currently located within a bounding box of interest near a sporting event, the LIA module 114 can flag that a user corresponding to the mobile device is a high priority target for receiving a profile update.

Once the LIA module 114 completes profile computations, the LIA module 114 can provide the computed profiles to a service provider. In some embodiments, the service provider can receive the computed profiles in bulk. In other embodiments, the service provider can query the LIF module 112 and/or the LIA module 114 incrementally to get the computed profiles as needed, or can receive bulk profile updates at scheduled intervals.

In some embodiments, the profiles generated by the LIA module 114 can be accessible only by the application that provided the location information to the LIA module 114. Also, the target entities received by the LIF module 112 and/or the LIA module 114 can be hashed or encrypted prior to the receipt by the LIF module 112 and/or the LIA module 114, thereby providing anonymity of users. These features can allow the LIF module 112 and/or the LIA module 114 to respect privacy of target entities that provided the location data points to the LIF module 112 and/or the LIA module 114.

In some embodiments, the computed profile can be provided in a tabular form. FIG. 16 illustrates a profile of a target entity in a tabular form in accordance with some embodiments.

In some embodiments, the LIA module 114 can be configured to learn a predictive model, based on the computed profile, that can predict a behavior of the target entity associated with the computed profile. In some cases, the predictive model can be a non-parametric model.

Figure 17A:
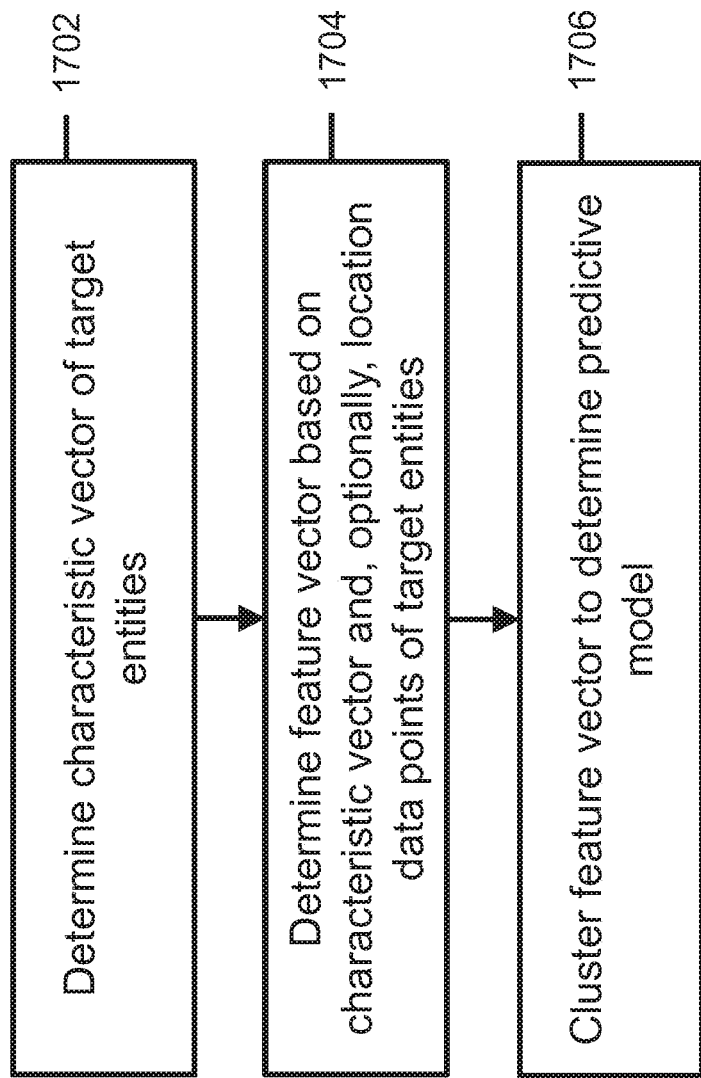
FIGS. 17A-17B illustrate a process for training and applying a predictive behavioral model in accordance with some embodiments.

FIG. 17A illustrates a process of learning a predictive model in accordance with some embodiments. In step 1702, the LIA module 114 is configured to represent a target entity into a characteristic vector. The characteristic vector can be indicative of a variety of characteristics associated with a target entity. For example, the characteristic vector can include attributes in the computed profile of target entities. As another example, the characteristic vector can include an element that is indicative of whether the target entity is operated by a male or female. When the target entity is operated by a male, an element in the characteristic vector can have a value of "1"; when the target entity is operated by a female, an element in the characteristic vector can have a value of "0"; and when the target entity is operated by an unknown gender, an element in the characteristic vector can have a value of "0.5".

In step 1704, the LIA module 114 can optionally associate the characteristic vector of the target entity with the location data points of the target entity to form a feature vector. For example, the characteristic vector of the target entity can be concatenated with the location data points of the target entity to form the feature vector. In some cases, the location data points can be represented as various spatial and temporal resolutions. For example, the spatial coordinates of the location data points can be represented using geohashes having a predetermined precision (e.g., anywhere between 20 to 40 bits of precision), and the temporal information associated with the spatial coordinates can be represented at various temporal resolutions (e.g., anywhere between 15 minutes to 6 hours).

In step 1706, the LIA module 114 can cluster all feature vectors corresponding to all target entities in a dataset, and average the feature vectors in each cluster to form an average vector for each cluster. Along with the average vector, the LIA module 114 can also maintain the number of target entities corresponding to each cluster. The average vector of a cluster and, optionally, the number of target entities corresponding to the cluster can form a non-parametric predictive model for behavioral characteristics.

In some embodiments, step 1704 is skipped and the characteristic vector is used as the feature vector for step 1706.

Figure 17B:
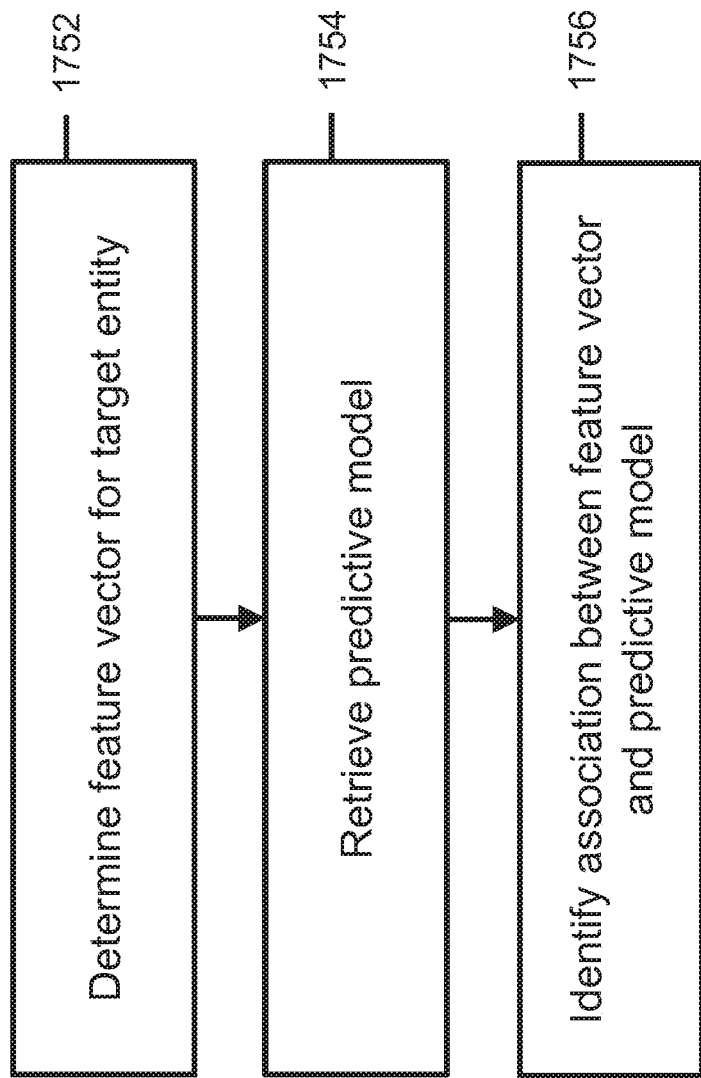

In some embodiments, the LIA module 114 can use the predictive model to predict a behavior of the target entity associated with the computed profile. FIG. 17B illustrates a process of using the predictive model to predict a behavior of the target entity associated with the computed profile. In step 1752, the LIA module 114 is configured to determine a feature vector of the target entity. The feature vector can be formatted in accordance with the format vector used to train the predictive model in step 1704. In step 1754, the LIA module 114 can retrieve the predictive model, and in step 1756, the LIA module 114 is configured to determine an association between the feature vector of the target entity and clusters in the predictive model. The association can be determined by finding a set of weights to be applied to the average vector of clusters to represent the feature vector as a weighted average of average vector of clusters. The set of weights can identify the amount of shared information between the feature vector and the predictive model.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. An apparatus comprising:
a processor configured to acquire computer readable instructions stored in one or more memory devices and execute the instructions to:
process a time-series of location data points for a target entity, wherein the time-series of location data points are received from a computing device associated with the target entity;
determine one or more sessions from the time-series of location data points by grouping one or more of the time-series of location data points;
determine one or more attributes associated with the target entity based on one or more of: the time-series of location data points, and the one or more sessions; and
generate a profile of the target entity based on the one or more attributes associated with the target entity.

2. The apparatus of claim 1, wherein the processor is further configured to execute the instructions to determine an accuracy of the time-series of the location data points, and discard, based on the determined accuracy, one or more of the location data points in the time-series of the location data points.

3. The apparatus of claim 2, wherein the processor is further configured to execute the instructions to determine the accuracy of the time-series of the location data points based on a time-series of the location data points associated with other target entities.

4. The apparatus of claim 3, wherein the processor is further configured to execute the instructions to determine the accuracy of the time-series of the location data points at a particular time instance based on location information associated with the other target entities at the particular time instance.

5. The apparatus of claim 1, wherein the processor is further configured to execute the instructions to:
determine one or more clusters of sessions based on the one or more sessions and based on a physical proximity between the sessions; and
determine the one or more attributes associated with the target entity based on the one or more sessions and the one or more clusters of sessions.

6. The apparatus of claim 5, wherein the processor is further configured to execute the instructions to associate at least one of the location data points, the sessions, or the clusters of sessions with annotation information associated with a geographical location of the location data points, sessions, or clusters of sessions, and use the annotation information to determine the one or more attributes associated with the target entity.

7. The apparatus of claim 6, wherein the processor is further configured to execute the instructions to determine the one or more attributes associated with the target entity based on movements of the target entity between two or more clusters of sessions.

8. The apparatus of claim 7, wherein the processor is further configured to execute the instructions to determine a home location attribute based on, at least in part, statistical measures on the movements of the target entity and the annotation information associated with the target entity.

9. The apparatus of claim 1, wherein the processor is further configured to execute the instructions to determine a home location attribute based on, at least in part, a likelihood that a particular location is associated with a residence.

10. The apparatus of claim 1, wherein the processor is further configured to execute the instructions to determine a home location attribute based on, at least in part, timestamps of the location data points associated with the target entity.

11. The apparatus of claim 1, wherein the processor is further configured to execute the instructions to determine a predictive model based on the one or more attributes, wherein the predictive model is configured to predict a behavior of the target entity in a future.

12. The apparatus of claim 1, wherein the processor is further configured to execute the instructions to rank patterns of movement of the target entity, and determine the one or more attributes associated with the target entity based on the ranking of the patterns of movement of the target entity.

13. A method comprising:
processing, by a first computing device, a time-series of location data points for a target entity received from a second computing device associated with the target entity;
determining, by the first computing device, one or more sessions from the time-series of the location data points by grouping one or more of the time-series of the location data points;
determining, by the first computing device, one or more attributes associated with the target entity based on one or more of: the time-series of the location data points, and the one or more sessions; and
generating, by the first computing device, a profile of the target entity based on the one or more attributes associated with the target entity.

14. The method of claim 13, further comprising determining, by the first computing device, an accuracy of the time-series of the location data points, and discarding, by the first computing device, one or more of the location data points in the time-series of the location data points based on the determined accuracy.

15. The method of claim 13, further comprising:
determining, by the first computing device, one or more clusters of sessions based on the one or more sessions and based on a physical proximity between sessions; and
determining, by the first computing device, the one or more attributes associated with the target entity based on the one or more sessions and the one or more clusters of sessions.

16. The method of claim 15, further comprising annotating, by the first computing device, the one or more clusters of sessions with annotation information associated with a geographical location of the one or more clusters of sessions, and determining, by the first computing device, the one or more attributes associated with the target entity based on the annotation information.

17. The method of claim 13, further comprising ranking, by the first computing device, patterns of movement of the target entity, and generating, by the first computing device, the at least one prediction of a future estimated location of the target entity based on a ranking of the patterns of movement of the target entity.

18. A non-transitory computer readable medium having executable instructions executable to cause a data processing apparatus to:
process a time-series of location data points for a target entity, wherein the time-series of location data points are received from a computing device associated with the target entity;

determine one or more sessions from the time-series of location data points by grouping one or more of the time-series of the location data points;

determine one or more attributes associated with the target entity based on one or more of: the time-series of the location data points, and the one or more sessions; and generate a profile of the target entity based on the one or more attributes associated with the target entity.

19. The non-transitory computer readable medium of claim 18, wherein the executable instructions are further executable to cause the data processing apparatus to determine an accuracy of the time-series of the location data points, and discard, based on the determined accuracy, one or more of the location data points in the time-series of the location data points.

20. The non-transitory computer readable medium of claim 18, wherein the executable instructions are further executable to cause the data processing apparatus to:

determine one or more clusters of sessions based on the one or more sessions and based on a physical proximity between the sessions; and determine the one or more attributes associated with the target entity based on the one or more sessions and the one or more clusters of sessions.

* * * * *